US011828874B2

(12) United States Patent
Okuni et al.

(10) Patent No.: US 11,828,874 B2
(45) Date of Patent: Nov. 28, 2023

(54) ELECTRONIC APPARATUS AND METHOD

(71) Applicant: Kabushiki Kaisha Toshiba, Minato-ku (JP)

(72) Inventors: Hidenori Okuni, Yokohama (JP); Tuan Thanh Ta, Kawasaki (JP); Satoshi Kondo, Kawasaki (JP); Akihide Sai, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 902 days.

(21) Appl. No.: 16/564,406

(22) Filed: Sep. 9, 2019

(65) Prior Publication Data

US 2020/0300975 A1   Sep. 24, 2020

(30) Foreign Application Priority Data

Mar. 18, 2019   (JP) .................................. 2019-050178

(51) Int. Cl.
*G01S 7/48*   (2006.01)
*G01S 7/486*   (2020.01)
(Continued)

(52) U.S. Cl.
CPC .......... *G01S 7/4808* (2013.01); *G01S 7/4861* (2013.01); *G01S 7/4865* (2013.01); *G01S 17/10* (2013.01)

(58) Field of Classification Search
None
See application file for complete search history.

(56) References Cited

U.S. PATENT DOCUMENTS

2004/0070748 A1*   4/2004   Inaba ...................... G01S 17/10
356/5.01
2006/0037392 A1*   2/2006   Carkner .............. G01F 23/2962
73/290 V (Continued)

FOREIGN PATENT DOCUMENTS

JP   10-253760 A   9/1998
JP   2007-225342 A   9/2007

(Continued)

OTHER PUBLICATIONS

S. Kawahito, I. A. Halin, T. Ushinaga, T. Sawada, M. Homma and Y. Maeda, "A CMOS Time-of-Flight Range Image Sensor With Gates-on-Field-Oxide Structure," in IEEE Sensors Journal, vol. 7, No. 12, pp. 1578-1586, Dec. 2007, doi: 10.1109/JSEN.2007.907561.*

(Continued)

*Primary Examiner* — Mohammad J Rahman
(74) *Attorney, Agent, or Firm* — Oblon, McClelland, Maier & Neustadt, L.L.P.

(57) ABSTRACT

An electronic apparatus capable of determining a distance to an object based on reflected light provided by a reflection of pulsed light on the object has detectors configured to detect reception light to measure times from an emission of the pulsed light to detections of the reception light; and processing circuitry configured to determine a duration in which the reflected light is received based on the times, determine, based on one of the times in the duration, a reception timing of the reflected light included in the reception light, and determine the distance from the electronic apparatus to the object according to the reception timing of the reflected light.

19 Claims, 17 Drawing Sheets

(51) Int. Cl.
*G01S 17/10* (2020.01)
*G01S 7/4861* (2020.01)
*G01S 7/4865* (2020.01)

(56) References Cited

U.S. PATENT DOCUMENTS

| | | | | |
|---|---|---|---|---|
| 2007/0138284 A1* | 6/2007 | Giordano | ............ | H04N 1/02865 |
| | | | | 235/454 |
| 2009/0115992 A1* | 5/2009 | Sakai | ............ | G01S 17/14 |
| | | | | 356/5.01 |
| 2009/0262760 A1* | 10/2009 | Krupkin | ............ | G01S 13/22 |
| | | | | 356/28 |
| 2010/0127183 A1* | 5/2010 | Iseki | ............ | A61N 5/1043 |
| | | | | 250/396 ML |
| 2012/0075615 A1* | 3/2012 | Niclass | ............ | G01S 7/489 |
| | | | | 356/5.01 |
| 2015/0041625 A1 | 2/2015 | Dutton et al. | | |
| 2016/0170024 A1* | 6/2016 | Böckem | ............ | G01S 7/4818 |
| | | | | 356/4.01 |
| 2017/0223337 A1* | 8/2017 | Sung | ............ | G01S 17/89 |
| 2017/0366275 A1* | 12/2017 | Charlantini | ............ | H04B 10/60 |
| 2018/0203158 A1* | 7/2018 | Ulmer | ............ | G01S 17/86 |
| 2018/0324908 A1* | 11/2018 | Denker | ............ | G06V 10/40 |
| 2019/0250257 A1* | 8/2019 | Finkelstein | ............ | G01S 7/4813 |
| 2019/0277772 A1* | 9/2019 | Nishizawa | ............ | G01N 21/93 |
| 2020/0149980 A1* | 5/2020 | Roth, II | ............ | G01N 29/075 |
| 2020/0191958 A1 | 6/2020 | Ikuta et al. | | |
| 2020/0357166 A1* | 11/2020 | Linåker | ............ | G06T 17/20 |
| 2020/0379095 A1* | 12/2020 | Kappel | ............ | G01S 7/4866 |
| 2020/0400820 A1* | 12/2020 | Nauen | ............ | G01S 7/484 |

FOREIGN PATENT DOCUMENTS

| | | |
|---|---|---|
| JP | 2018-40656 A | 3/2018 |
| WO | WO 2018/211762 A1 | 11/2018 |

OTHER PUBLICATIONS

Perenzoni, M, et al., "A 64x64-Pixels Digital Silicon Photomultiplier Direct TOF Sensor With 100-MPhotons/s/pixel Background Rejection and Imaging/Altimeter Mode With 0.14% Precision Up to 6 km for Spacecraft Navigation and Landing", IEEE Journal of Solid-State Circuits, vol. 52, No. 1, Jan. 2017, pp. 151-160.

Perenzoni, M, et al., "A 64x64-Pixel Digital Silicon Photomultiplier Direct ToF Sensor With 100-MPhotons/s/pixel Background Rejection and Imaging/Altimeter Mode With 0.14% Precision Up to 6 km for Spacecraft Navigation and Landing", IEEE International Solid-State Circuits Conference (ISSCC), 2016, 3 pages.

* cited by examiner

ELECTRONIC APPARATUS AND METHOD

CROSS REFERENCE TO RELATED APPLICATIONS

This application is based upon and claims the benefit of priority from the prior Japanese Patent Application No. 2019-50178, filed on Mar. 18, 2019, the entire contents of which are incorporated herein by reference.

FIELD

Embodiments of the present invention relate to an electronic apparatus and a method for measuring distance.

BACKGROUND

There has been developed an electronic apparatus that measures, using a time from emission of light to reception of reflected light reflected by an object, a distance to the object. An electronic apparatus capable of suppressing an error of time until receiving the reflected light reflected by the object and improving accuracy in measuring a distance to the object is desired.

DETAILED DESCRIPTION

According an embodiment of the present disclosure, an electronic apparatus capable of determining a distance to an object based on reflected light provided by a reflection of pulsed light on the object has detectors configured to detect reception light to measure times from an emission of the pulsed light to detections of the reception light; and processing circuitry configured to determine a duration in which the reflected light is received based on the times, determine, based on one of the times in the duration, a reception timing of the reflected light included in the reception light, and determine the distance from the electronic apparatus to the object according to the reception timing of the reflected light.

Hereinafter, embodiments for carrying out the invention will be described.

First Embodiment

Figure 1:
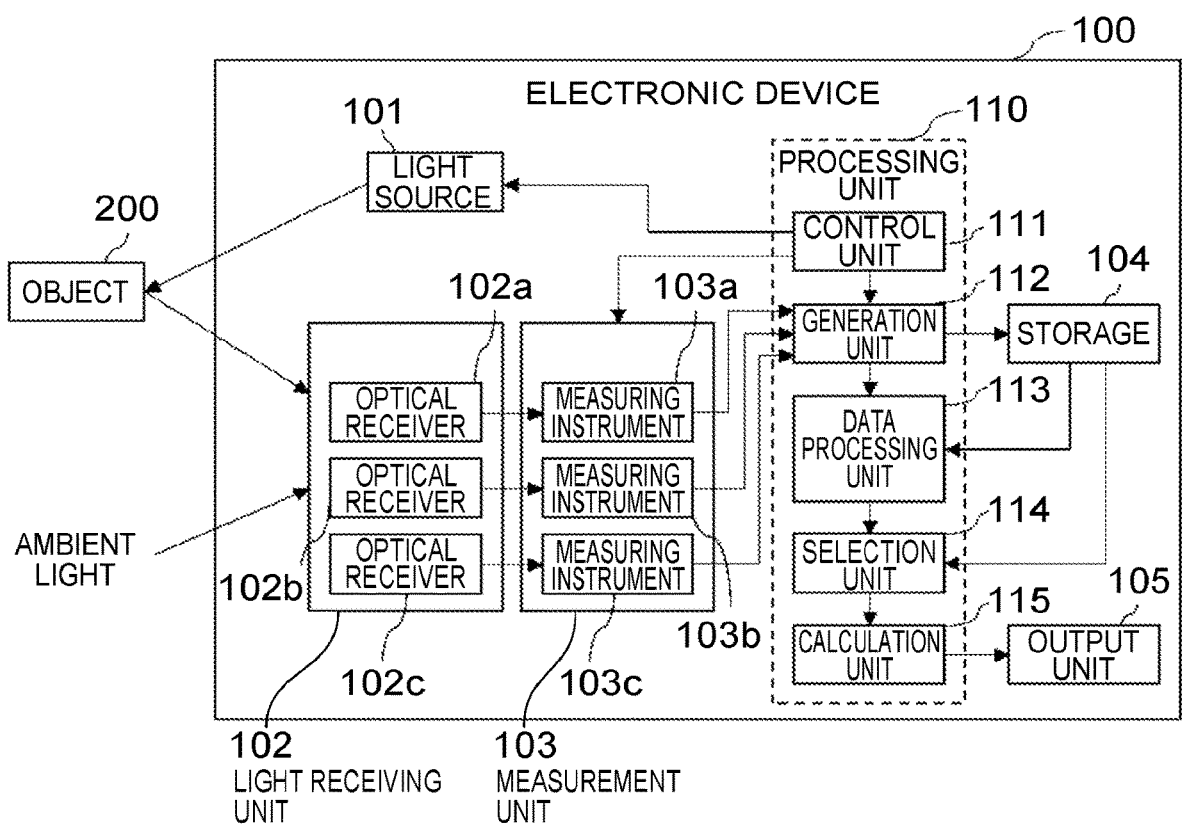
FIG. 1 is a diagram of a distance measurement system including an electronic apparatus according to a first embodiment.

FIG. 1 illustrates a distance measurement system according to the present embodiment. In the distance measurement system, an electronic apparatus (electronic device) 100 is an electronic apparatus that measures a distance to an object 200.

The electronic apparatus 100 includes a light source 101, a light receiving unit 102, a measurement unit 103, and a processing unit (processing circuitry) 110. The light source 101 emits an electromagnetic wave having a duration of time to the object 200. The duration of time will be hereinafter referred to as a pulse width, and the electromagnetic wave will be hereinafter referred to as pulsed light. The pulsed light is reflected by the object 200, and a part of (hereinafter also referred to as reflected light) of the reflected pulsed light is received by the light receiving unit 102.

In addition, as illustrated in FIG. 1, the light receiving unit 102 also receives light other than the reflected light. That is, for example, light (lighting or lighting of a lamp) emitted by a device other than the electronic apparatus 100, light derived from sunlight, and the like. Hereinafter, the light other than the reflected light will be referred to as ambient light.

The measurement unit 103 measures a time from the time at which the light source 101 emits the pulsed light to the time at which the light receiving unit 102 receives the light (hereinafter also referred to as light receiving time). Since the light receiving unit 102 also receives ambient light in addition to the reflected light, there is a plurality of the light receiving times measured by the measurement unit 103. The light receiving unit 102 has detectors that detect reception light to measure times from an emission of the pulsed light to detections of the reception light.

The processing unit 110 determines a duration in which the reflected light is received based on the times, determines, based on one of the times in the duration, a reception timing of the reflected light included in the reception light, and determines the distance from the electronic apparatus to the object according to the reception timing of the reflected light. The processing unit 110 determines a duration to maximize a number of the times included in the duration. The processing unit 110 determines, from the plurality of light receiving times, a time (time of flight: hereinafter also referred to as ToF) from the emission of the pulsed light to the reception of the reflected light.

On the basis of the ToF, the processing unit 110 calculates a distance d between the electronic apparatus 100 and the object 200 according to the following formula (1).

$$d = \frac{T_oF}{2} \cdot c \qquad (1)$$

Here, c represents the speed of light (approximately $3 \times 10^8$ m/s).

Accuracy of the ToF needs to be improved to improve accuracy of the distance d. The influence of the ambient light needs to be reduced to improve the accuracy of ToF. In the electronic apparatus 100 according to the present embodiment, the light receiving unit 102 includes a plurality of optical receivers, and the measurement unit 103 includes a plurality of measuring instruments. Each of the optical receivers receives photons of pulsed light and ambient light, and a measuring instrument corresponding to the optical receiver measures a time from the time at which the light source 101 emits the pulsed light to the time at which the optical receiver receives the photons (hereinafter also referred to as light receiving time in a similar manner to the case of light).

Once the optical receiver receives a photon, it cannot receive the next photon for a predetermined time dependent on the optical receiver. The light receiving unit 102 includes a plurality of optical receivers so that photons can be received even during the predetermined time. The measurement unit 103 includes measuring instruments corresponding to the optical receivers to measure the light receiving time in each of the plurality of optical receivers.

The processing unit 110 generates light receiving time data including the time until the optical receiver receives a photon. The light receiving times included in a predetermined time zone (hereinafter referred to as light receiving time distribution) are calculated from the light receiving time data. The time zone may be also called as a duration in the present specification. In the present embodiment, the light receiving time distribution is calculated by counting the light receiving times included in the predetermined time zone. In more detail, the processing unit 110 determines a time zone in which reflected light is received on a basis of light receiving times output from a plurality of measuring units in the measurement unit 103, and determines a light receiving time at which the reflected light has been received on a basis of the number of light receiving times per section included in the time zone, thereby determining the distance from the electronic apparatus 100 to the object 200 on a basis of the determined receiving time. In more specific example, the processing unit 110 calculates the distribution of light receiving times of light received by a plurality of optical receivers in the light receiving unit 102, and determines the time zone on a basis of the calculated distribution of light receiving times. In the following, an example of determining the time zone on a basis of the calculated distribution of light receiving times will be explained. However, it is also possible to determine the time zone without calculating the distribution of light receiving times. For example, by detecting the density of the number of light receiving times, the location of higher density may be determined as the time zone.

The pulsed light used in the embodiment has density of the number of photons higher than that of ambient light. Accordingly, the number of photons of the pulsed light included in the predetermined time zone is larger than that of the ambient light. The number of the light receiving times of the pulsed light to be measured is therefore larger than the number of the light receiving times of the ambient light to be measured in the same time zone. In other words, the number of the light receiving times of the reflected light to be measured is larger than the number of the light receiving times of the ambient light to be measured in the same time zone.

The electronic apparatus 100 selects a time zone in which the optical receiver receives the reflected light on the basis of the light receiving time distribution. Furthermore, the electronic apparatus 100 determines ToF on the basis of the time zone in which the reflected light is received. Hereinafter, reception of the reflected light indicates that the reflected light is received by the optical receiver. The electronic apparatus 100 calculates the distance d on the basis of the determined ToF and the formula (1).

By selecting the time zone in which the reflected light is received from the light receiving time data and determining ToF, the electronic apparatus 100 can determine the reflected light while the influence of ambient light is reduced, whereby the accuracy of the ToF can be improved. In addition, the electronic apparatus 100 is capable of reducing occurrence of an error of ToF, whereby the accuracy of the ToF can be improved. In other words, the electronic apparatus 100 is capable of calculating the distance d highly accurately.

The electronic apparatus 100 includes a storage 104 and an output unit 105 in addition to the light source 101, the light receiving unit 102, the measurement unit 103, and the processing unit 110. The processing unit 110 includes a control unit 111, a generation unit 112, a data processing unit 113, a selection unit 114, and a calculation unit 115.

The light source 101 is a device that receives a command from the control unit 111 and emits pulsed light to the object 200. For example, the light source 101 may be a combination of a laser light source, such as a laser diode, and a circuit that generates a pulse. The light source 101 may also be a combination of a light emitting diode (LED) or various lamps and the circuit that generates a pulse.

Furthermore, there is no limitation on a frequency band of the pulsed light emitted by the light source 101. The pulsed light may be, for example, visible light, infrared light, near-infrared light, ultraviolet light, or a combination thereof. As an example, the pulsed light in the present embodiment is assumed to include a visible light component.

Furthermore, there is no limitation on a shape of the pulsed light emitted by the light source 101. It may be rectangular, triangular, a shape of a sinc function, or a shape of a Gaussian curve.

Examples of the command that the light source 101 receives from the control unit 111 include a pulse width (e.g., 24 ns) and a shape of the pulsed light to be emitted, and a timing and a direction for emitting the pulsed light.

The pulsed light emitted by the light source 101 is reflected by the object 200, and is made incident on the light receiving unit 102 as reflected light. The reflected light may be either diffused reflected light or specular reflected light of the pulsed light on the object 200, or may be a combination thereof.

The light receiving unit 102 includes a plurality of optical receivers. Each of the optical receivers receives a photon, and outputs signals indicating that that photon is received. The signals are transmitted to the corresponding measuring instrument of the measurement unit 103, and are used to measure the light receiving time. In the present embodiment, as an example, the light receiving unit 102 includes three optical receivers 102a, 102b, and 102c.

Any type of devices can be used as the optical receivers 102a, 102b, and 102c as long as photons can be detected. For example, it may be photodiodes, photomultiplier tubes, and the like. An avalanche photo diode (APD) having high detection sensitivity of light may be used as the photodiode. The APD may be used in the Geiger mode. A multi-pixel photon counter (MPPC) may be used as an array of the APD. Furthermore, a silicon photomultiplier (SiPM) may be used as the photomultiplier tube. In the present embodiment, it is assumed that the APD is used in the Geiger mode as an example.

The optical receivers 102a, 102b, and 102c receive photons and output signals indicating that the photons are received, and do not distinguish the received photons. That is, the optical receivers 102a, 102b, and 102c do not distinguish between the reflected light and the ambient light.

Note that the reflected light is light obtained by the pulsed light being reflected by the object 200, which does not include light obtained by the ambient light being reflected by the object 200, and is classified as the ambient light.

The measurement unit 103 includes a plurality of measuring instruments 103a, 103b, and 103c. Each of the measuring instruments measures light receiving time on the basis of the signals transmitted from the corresponding optical receiver. For example, the measuring instrument 103a measures the light receiving time on the basis of the signals transmitted from the optical receiver 102a. The measuring instruments 103b and 103c are also similar to the case of the measuring instrument 103a. The measurement unit 103 receives, from the control unit 111, a command of a time range (hereinafter also referred to as a measurement range) from the time at which measurement of the light receiving time starts to the time at which the measurement is terminated, and the like.

The measurement unit 103 measures the light receiving time on the basis of the commands and the signals transmitted from the light receiving unit 102. Since the light receiving unit 102 receives photons without distinguishing between the reflected light and the ambient light, the light receiving time measured by the measurement unit 103 is measured without distinguishing between the reflected light and the ambient light. The light receiving time is used by the generation unit 112 to generate light receiving time data including the light receiving time within the measurement range. That is, the light receiving time data includes the light receiving times of both the reflected light and the ambient light. The time at which the reflected light is received is determined from the light receiving time data.

Note that the measurement unit 103 may measure a time required for transmission between components of the electronic apparatus 100 in advance, and may correct the measured ToF. The corrected ToF is also included in the time from the time at which the light source 101 emits the pulsed light to the time at which the light receiving unit 102 receives the reflected light.

Any type of devices can be used as the measuring instruments 103a, 103b, and 103c as long as the light receiving time can be measured on the basis of the command from the control unit 111 and the signals transmitted from the light receiving unit 102. In the present embodiment, a time to digital converter (TDC) is used as an example.

The storage 104 is an electronic apparatus that retains information. In the present embodiment, for example, the light receiving time data generated by the generation unit 112 is retained.

The storage 104 is a memory or the like, which is, for example, a random access memory (RAM), a read-only memory (ROM), a programmable ROM (PROM), an erasable PROM (EPROM), an electrically EPROM (EEPROM), a flash memory, a register, or the like.

The control unit 111 transmits commands to the light source 101, the measurement unit 103, and the generation unit 112. The command to the light source 101 is a pulse width (e.g., 24 ns) and a shape of the pulsed light to be emitted, time and a direction to start the emission of the pulsed light, and the like.

The command to the measurement unit 103 is a measurement range from the time at which the measurement of the light receiving time starts to the time at which the measurement is terminated, and the like. In the command transmitted from the control unit 111 to the light source 101 and the measurement unit 103, the time at which the emission of the pulsed light starts coincides with the time at which the measurement of the light receiving time starts. This coincidence includes a time lag that does not affect the determination of ToF. In addition, this coincidence includes, in a case where there is a delay or the like in the route for transmitting each command, a time lag in consideration of the delay.

The command to the generation unit 112 is a time range to be a target of light receiving time data to be generated. As an example, the time range is similar to the measurement range in the present embodiment. That is, the control unit 111 commands the generation unit 112 to include the light receiving time transmitted from the measurement unit 103 in the light receiving time data if it is within the measurement range, and not to include the light receiving time in the light receiving time data if it is outside the measurement range.

The generation unit 112 generates light receiving time data in which the light receiving times transmitted from the measurement unit 103 are arranged on the basis of the command transmitted from the control unit 111. The light receiving time data includes both the light receiving time of the reflected light and the light receiving time of the ambient light within the measurement range. The time zone in which the reflected light is received is selected from the light receiving time data.

The generation unit 112 causes the storage 104 to retain the generated light receiving time data. In addition, after the generation of the light receiving time data is complete, the generation unit 112 notifies the data processing unit 113 of the fact that the light receiving time data is available.

The data processing unit 113 calculates light receiving time distribution representing the light receiving times included in a predetermined time zone on the basis of the light receiving time data retained in the storage 104. The light receiving time data includes the light receiving times of both the reflected light and the ambient light. With the data processing unit 113 calculating the light receiving time distribution on the basis of the light receiving time data, the selection unit 114 can determine the light receiving time of the reflected light.

Note that the data processing unit 113 can calculate the light receiving time distribution by any method. In the present embodiment, the data processing unit 113 calculates a histogram of the light receiving time distribution as an example.

The selection unit 114 determines ToF. In order to determine the ToF, the selection unit 114 selects a time zone at which the reflected light is received on the basis of the light receiving time distribution transmitted from the data processing unit 113. Since the number of the light receiving times of the reflected light included in the predetermined time zone is larger than the number of the light receiving times of the ambient light, the selection unit 114 selects the time zone with the larger number of the light receiving times as the time zone in which the reflected light is received.

The selection unit 114 extracts the light receiving time in the time zone in which the reflected light is received from the selected time zone in which the reflected light is received and the light receiving time data read from the storage 104. The selection unit 114 determines the ToF on the basis of the extracted light receiving time. The ToF is transmitted to the calculation unit 115, and is used to calculate the distance d.

The calculation unit 115 calculates the distance d between the electronic apparatus 100 and the object 200 on the basis of the ToF transmitted from the selection unit 114 and the formula (1). The distance d is transmitted to the output unit 105. The transmission of the distance d to the output unit 105 may be performed on the basis of the command from the control unit 111.

The output unit 105 outputs information including the distance d transmitted from the calculation unit 115. An output destination is not limited, and may be a device and a system that operate at least on the basis of the distance d, an electronic apparatus including a display, a storage device (not illustrated) that retains the distance d, and the like. Note that those devices and systems may be inside or outside the electronic apparatus 100. In addition, a format of information indicating the distance d is not limited, and may be a format that can be used as data, text, a two-dimensional drawing, a three-dimensional drawing, and the like. Moreover, an output format may be wired or wireless.

The processing unit 110 including the control unit 111, the generation unit 112, the data processing unit 113, the selection unit 114, and the calculation unit 115 is electronic circuitry (processor) including an arithmetic device and a controller of hardware. Examples of the processor include a general-purpose processor, a central processing unit (CPU), a microprocessor, a digital signal processor (DSP), and a combination thereof.

The components of the electronic apparatus 100 have been described above. The connection between the components may be wired or wireless. Furthermore, the electronic apparatus 100 is mounted as integrated circuitry, such as an integrated circuit (IC) and large scale integration (LSI). It may be collectively mounted on one chip, or a part of the components may be mounted on another chip.

In calculating the distance d, the electronic apparatus 100 according to the present embodiment calculates light receiving time distribution representing the frequency of the received light, and selects the time zone in which the reflected light is received. The electronic apparatus 100 determines ToF on the basis of the time zone in which the reflected light is received, and calculates the distance d. The operation of calculating the distance d performed by the electronic apparatus 100 according to the present embodiment will be described with reference to FIGS. 2 to 5.

Figure 2:
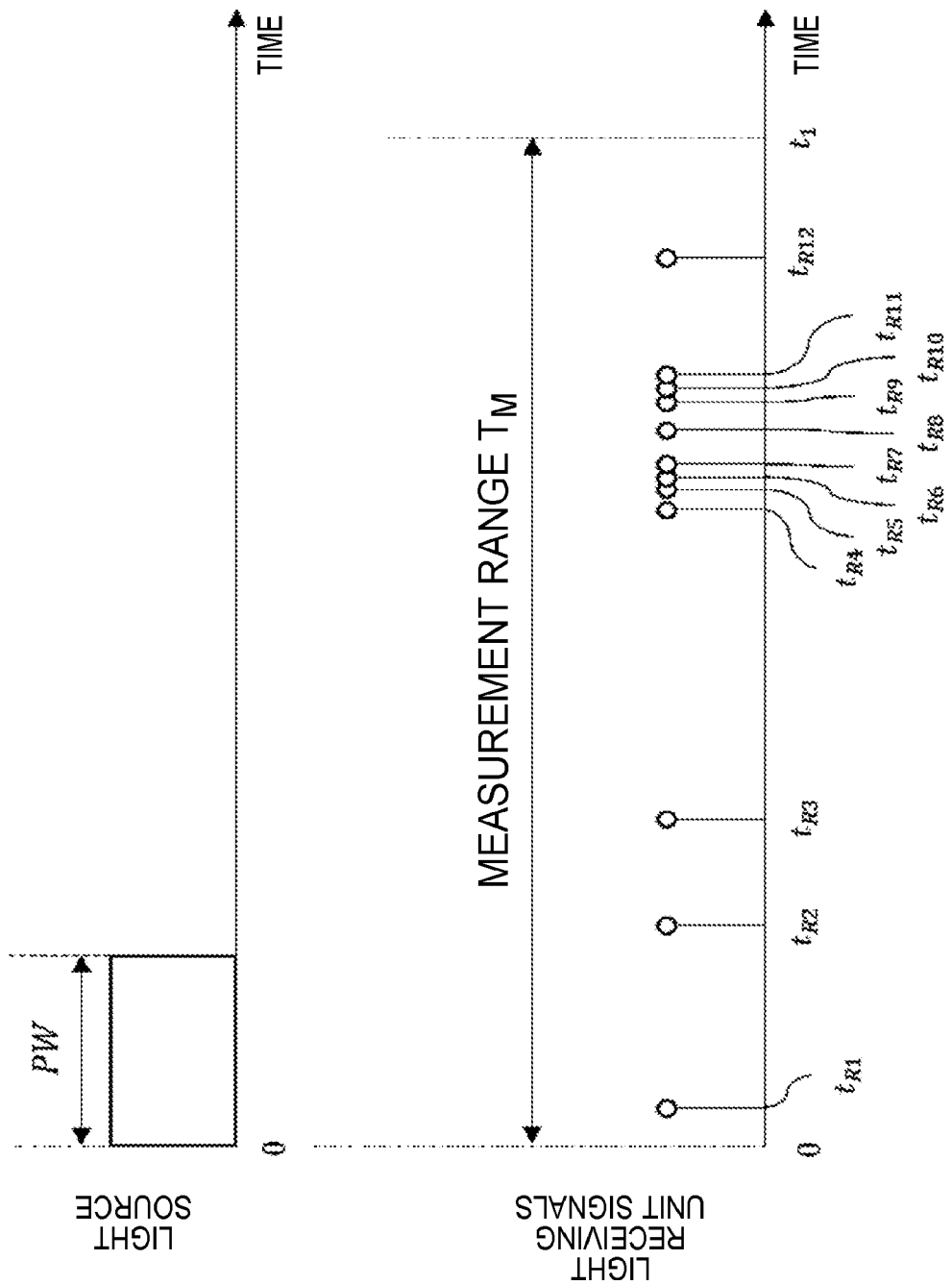
FIG. 2 is a diagram for illustrating emission of pulsed light by a light source and signals output from a light receiving unit.

FIG. 2 illustrates the emission of the pulsed light by the light source 101 and the signals output from the light receiving unit 102 at each time. The signals output from the light receiving unit 102 indicates that the light receiving unit 102 has received light.

Figure 3:
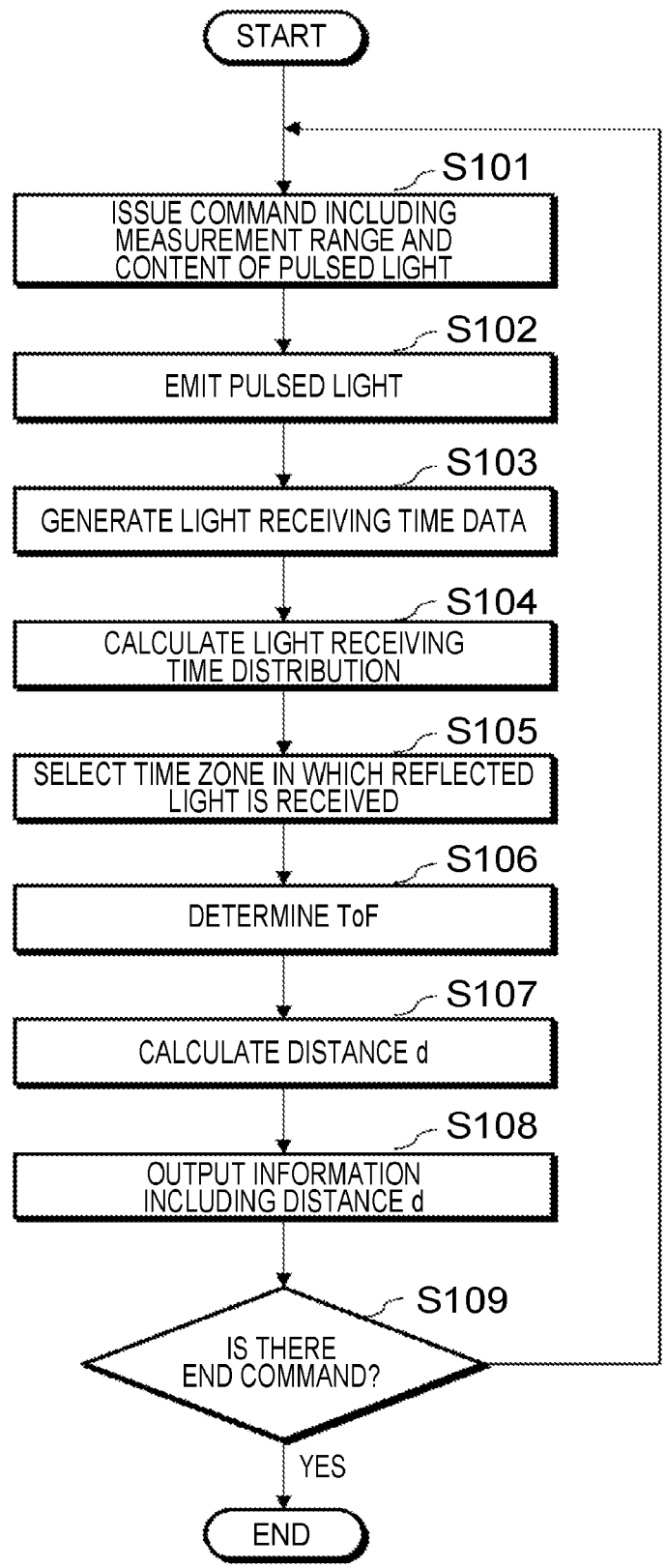
FIG. 3 is a flowchart of operation of the electronic apparatus.

FIG. 3 is a flowchart of the operation of the electronic apparatus 100 in calculating the distance d. Hereinafter, the operation of the electronic apparatus 100 will be described with reference to FIG. 2 and the flowchart of the operation.

First, operation of the electronic apparatus 100 until generating light receiving time data will be described using steps S101 to S103. The electronic apparatus 100 measures, using a predetermined measurement range and pulsed light, the time when photons are received within the measurement range, and generates light receiving time data. The light receiving time data includes both the light receiving time of the reflected light and the light receiving time of the ambient light within the measurement range.

The control unit 111 transmits commands necessary for generating the light receiving time data, such as the content of the pulsed light and the measurement range, to the light source 101, the measurement unit 103, and the generation unit 112 (step S101).

Specifically, the control unit 111 issues commands regarding the pulse width and the shape of the pulsed light to be emitted by the light source 101, and the start time and the direction of the emission of the pulsed light. In the present embodiment, as an example, the control unit 111 commands the light source 101 to emit rectangular pulsed light with a pulse width PW at the start time 0 toward the direction in which the object 200 exists.

The control unit 111 issues, to the measurement unit 103, a command regarding the measurement range that is a range in which the time at which the light receiving unit 102 receives light is measured. In FIG. 2, the measurement range according to the present embodiment is represented as a time length $T_M$ from the time 0 at which the light source 101 emits light to time $t_1$. The control unit 111 sets a predetermined value for the time length $T_M$. Note that the command is transmitted to the measuring instruments 103a, 103b, and 103c included in the measurement unit 103.

The control unit 111 issues, to the generation unit 112, a command regarding a time range to be a target of light receiving time data to be generated. In the present embodiment, the time range represents a measurement range.

Next, the light source 101 emits pulsed light (step S102). FIG. 2 illustrates that the light source 101 emits pulsed light with the pulse width PW at the time 0. At the time same as the emission of the light source 101, the measuring instruments 103a, 103b, and 103c start measuring the light receiving time.

The pulsed light emitted from the light source 101 is at least partially reflected by the object 200 that is a distance measurement target, and is received by the optical receivers 102a, 102b, and 102c as reflected light.

Upon reception of photons, the optical receivers 102a, 102b, and 102c transmit signals indicating that the photons have been received to the corresponding measuring instruments 103a, 103b, and 103c. The measuring instruments 103a, 103b, and 103c measure the light receiving time on the basis of the signals, and transmits it to the generation unit 112.

FIG. 2 illustrates that, in the measurement range, the measuring instruments 103a, 103b, and 103c have received photons from time $t_{R1}$ to time $t_{R12}$. Since the time at which the pulsed light is emitted is the time 0, the light receiving times measured by the measuring instruments 103a, 103b, and 103c is the light receiving time $t_{R1}$ to the light receiving time $t_{R12}$. The measuring instruments 103a, 103b, and 103c transmit those light receiving times $t_{R1}$ to $t_{R12}$ to the generation unit 112.

The generation unit 112 generates light receiving time data in which the light receiving times transmitted from the measuring instruments 103a, 103b, and 103c are arranged (step S103). In the present embodiment, the light receiving time data includes the light receiving times $t_{R1}$ to $t_{R12}$. The generation unit 112 causes the storage 104 to retain the light receiving time data.

After the measurement range ends, the generation unit 112 notifies the data processing unit 113 of the fact that the light receiving time data is available. Since the end of the measurement range is the time $t_1$ in FIG. 2, the generation unit 112 notifies the data processing unit 113 of the fact that the light receiving time data is available after the time $t_1$.

The foregoing has described the operation of the electronic apparatus 100 until the light receiving time data is generated. Next, operation of the electronic apparatus 100 until calculating the distance d will be described using steps S104 to S107. The electronic apparatus 100 calculates light receiving time distribution on the basis of the generated light receiving time data. The electronic apparatus 100 selects a time zone in which the reflected light is received on the basis of the calculated light receiving time distribution. The electronic apparatus 100 determines ToF on the basis of the time zone in which the reflected light is received, and calculates the distance d.

In response to the notification from the generation unit 112, the data processing unit 113 calculates light receiving time distribution on the basis of the light receiving time data retained in the storage 104 (step S104). That is, the data processing unit 113 calculates the light receiving time distribution after the measurement range ends. The light receiving time distribution is calculated in the form of a histogram in which the light receiving times included in the predetermined time zone are counted. The calculation of the light receiving time distribution will be specifically described with reference to FIG. 4.

Figure 4:
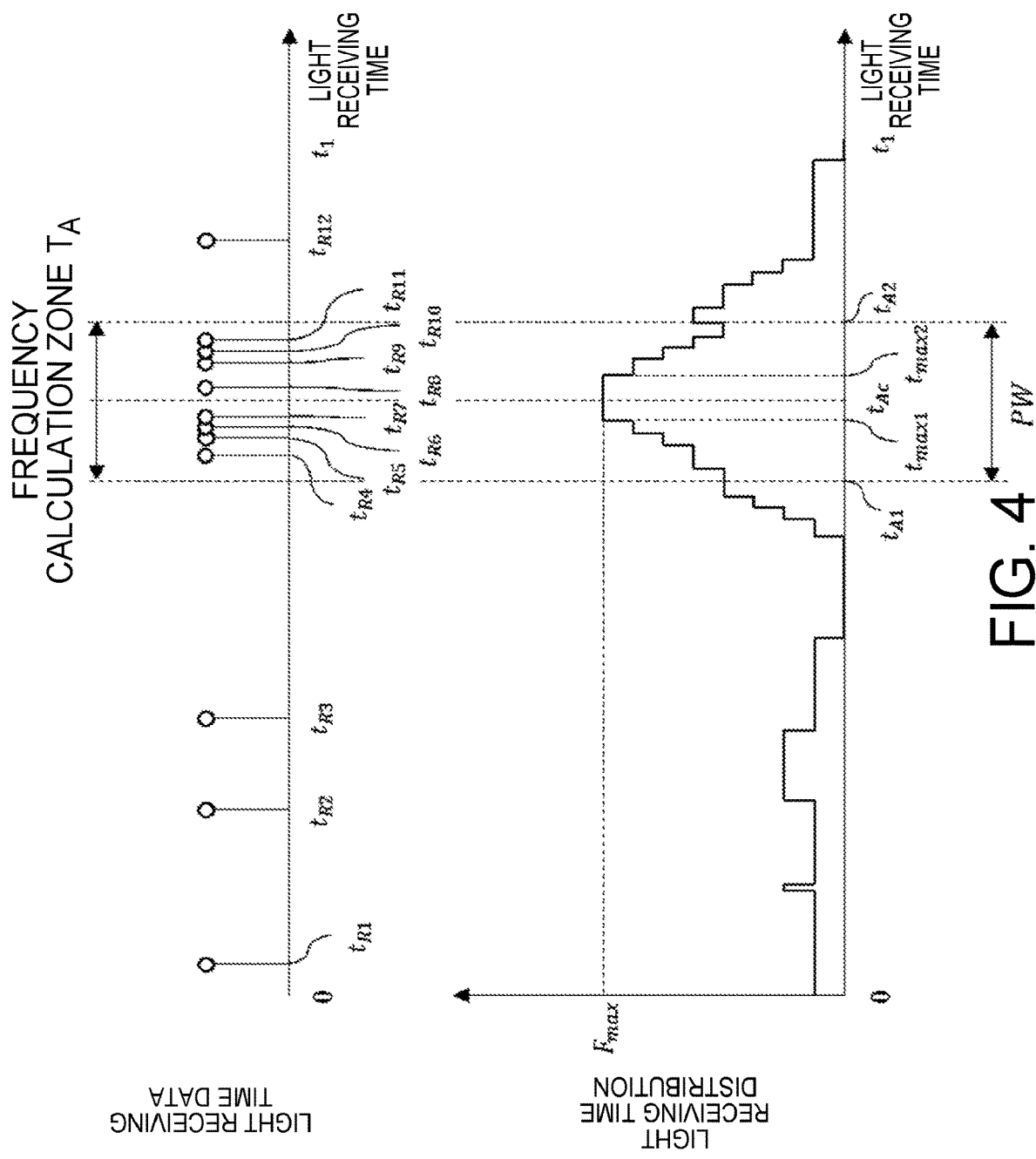
FIG. 4 is a diagram for illustrating a histogram of light receiving time and light receiving time distribution.

FIG. 4 illustrates the light receiving times included in the light receiving time data and the light receiving time distribution calculated by the data processing unit 113. Hereinafter, a predetermined time zone for counting the light receiving times will be referred to as a frequency calculation zone. In FIG. 4, the time length of the frequency calculation zone is represented as TA. The data processing unit 113 sets a predetermined value for the time length TA. In the present embodiment, as an example, the time length TA is assumed to be the same as the pulse width PW of the pulsed light emitted by the light source 101.

The data processing unit 113 counts the light receiving times included in the frequency calculation zone of the time length TA centered on a predetermined light receiving time. The predetermined light receiving time is optionally selected from a light receiving time 0 to a light receiving time $T_M$. The data processing unit 113 sets the number of counts as the light receiving time distribution at the predetermined light receiving time. The data processing unit 113 calculates the light receiving time distribution at each predetermined light receiving time while changing the predetermined light receiving time, thereby calculating a histogram of the light receiving time distribution. In the present embodiment, as an example, the light receiving time distribution is calculated from the light receiving time 0 at 1 ns intervals, thereby calculating the histogram of the light receiving time distribution.

The calculation of the light receiving time distribution at a light receiving time $t_{AC}$ illustrated in FIG. 4 will be described as an example. The data processing unit 113 counts the light receiving times included in the frequency calculation zone of the time length TA centered on the light receiving time $t_{AC}$. The frequency calculation zone illustrated in FIG. 4 is a zone from a light receiving time $t_{41}$ to a light receiving time $t_{42}$. The light receiving times included in the frequency calculation zone from the light receiving time $t_{41}$ to the light receiving time $t_{42}$ are from a light receiving time $t_{R4}$ to a light receiving time $t_{R11}$. The data processing unit 113 sets the number of counts as a light receiving time distribution $F_{max}$ at the time $t_{AC}$. The data processing unit 113 transmits the calculated histogram of the light receiving time distribution to the selection unit 114.

The selection unit 114 selects the time zone in which the reflected light is received on the basis of the calculated histogram of the light receiving time distribution (step S105). Specifically, the selection unit 114 selects the frequency calculation zone with the largest number of light receiving times in the histogram of the light receiving time distribution as the time zone in which the reflected light is received.

This is because, as described above, the number of the light receiving times of the reflected light to be measured is larger than the number of the light receiving times of the ambient light to be measured in the same time zone. In the present embodiment, as an example, the selection unit 114 selects the frequency calculation zone from the light receiving time $t_{41}$ to the light receiving time $t_{42}$ as the time zone in which the reflected light is received.

Figure 5:
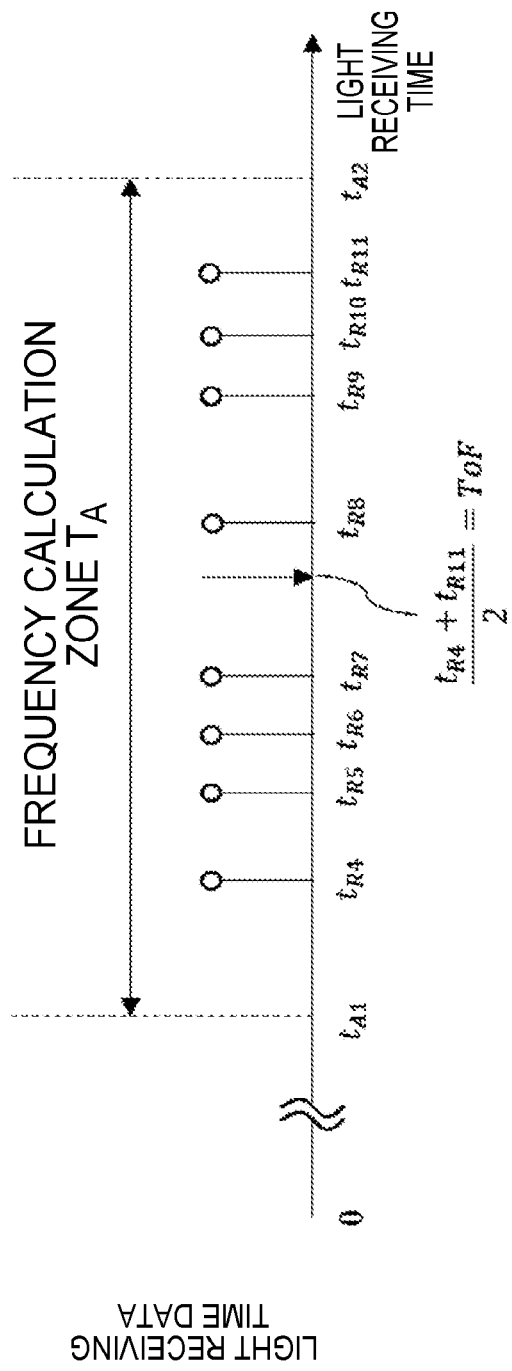
FIG. 5 is a diagram for illustrating calculation of time of flight (ToF) from light receiving times included in a frequency calculation zone.

The selection unit 114 determines ToF on the basis of the time zone in which the reflected light is received (step S106). The determination will be described with reference to FIG. 5. The selection unit 114 extracts the light receiving times included in the time zone in which the reflected light is received from the light receiving time data retained in the storage 104. In FIG. 5, the light receiving time $t_{R4}$ to the light receiving time $t_{R11}$ are shown as the light receiving times included in the frequency calculation zone from the time $t_{41}$ to the time $t_{42}$.

The selection unit 114 determines ToF on the basis of the extracted light receiving time. In the present embodiment, as an example, the selection unit 114 determines, as ToF, an average value of the first light receiving time $t_{R4}$ and the last light receiving time $t_{R11}$ included in the frequency calculation zone. The reason for the determination method will be described after description of the operation of the electronic apparatus 100 is complete. The selection unit 114 transmits the determined ToF to the calculation unit 115.

The calculation unit 115 calculates the distance d on the basis of the ToF transmitted from the selection unit 114 and the formula (1) (step S107). The calculated distance d is transmitted to the output unit 105.

Next, the output unit 105 outputs information including the distance d transmitted from the calculation unit 115 (step S108). The output destination and the output format are not limited as described above.

Next, the control unit 111 checks whether or not an end command for terminating the operation of the electronic apparatus 100 has arrived (step S108). The end command is a command for terminating the operation of the electronic apparatus 100 in the present flow. The end command is transmitted to the control unit 111 by a user making input to the electronic apparatus 100, the electronic apparatus 100 obtaining signals including the end command, or the like. The end command may be a command for immediately terminating the operation of the electronic apparatus 100.

In the case where the end command has not arrived at the control unit 111 (No in step S108), the process returns to step S101. On the other hand, in the case where the end command has arrived at the control unit 111 (Yes in step S108), the flow is terminated, and the electronic apparatus 100 terminates the operation.

The foregoing has described the operation of the electronic apparatus 100 according to the present embodiment. Hereinafter, the method of determining ToF will be described with reference to FIGS. 6 and 7. Note that the time from the light receiving time $t_{R4}$ to the light receiving time $t_{R11}$ described in the present embodiment is also the time from the time at which the pulsed light is actually emitted to the time at which the reflected light is received.

The pulsed light used in the present embodiment is generally in a coherent state. The number of emitted photons of the pulsed light in the coherent state follows Poisson distribution. Since the number of photons emitted as the pulsed light is not always constant, a time lag may occur between the time at which the pulsed light is emitted and the time at which the reflected light is received.

In addition, errors included in the previous (or later) light receiving times are accumulated except for the first light receiving time $t_{R4}$ and the last light receiving time $t_{R11}$ in the time from the emission of the pulsed light to the reception of the reflected light. Therefore, possibility of occurrence of a time lag in the light receiving time becomes higher than that in the light receiving time $t_{R4}$ and the light receiving time $t_{R11}$.

Figure 6:
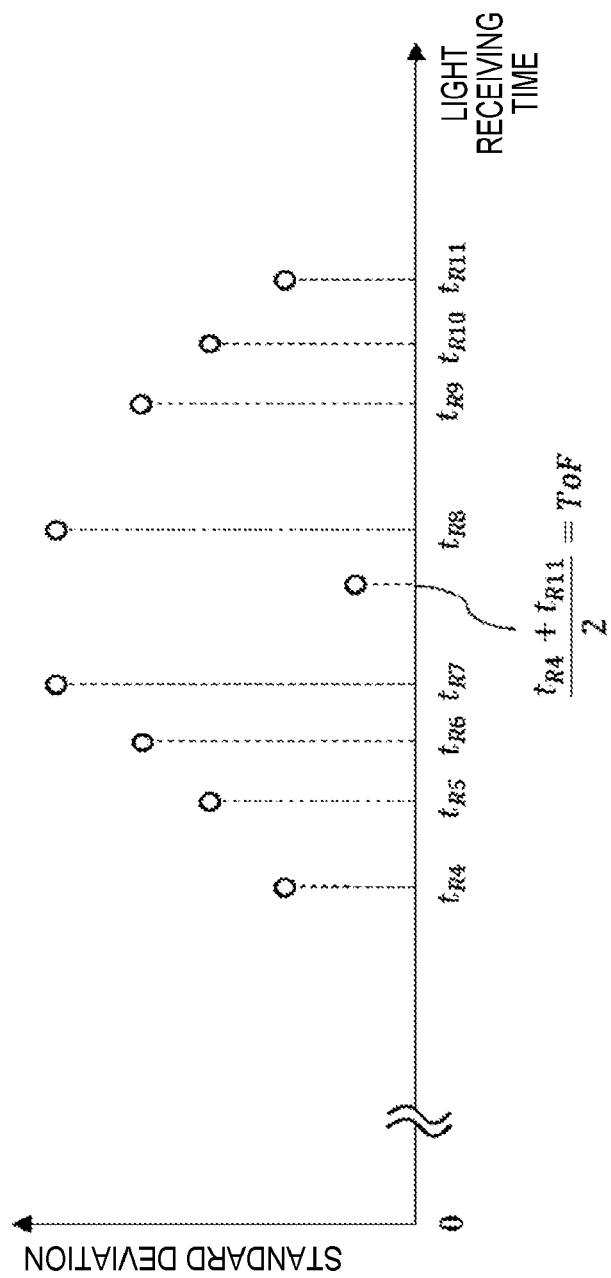
FIG. 6 is a diagram for illustrating standard deviation of the light receiving times included in the frequency calculation zone.

FIG. 6 illustrates standard deviation in the case where each of the light receiving times from the light receiving time $t_{R4}$ to the light receiving time $t_{R11}$ is measured a plurality of times. The standard deviation of the light receiving time $t_{R4}$ and the light receiving time $t_{R11}$ is small. On the other hand, the standard deviation becomes larger as the time is closer to the center of the time zone in which the reflected light is received, such as a light receiving time $t_{R7}$ and a light receiving time $t_{R3}$. It is indicated that the standard deviation is smaller in the average value of the light receiving time $t_{R4}$ and the light receiving time $t_{R11}$ and the possibility of including an error as ToF is low.

Figure 7:
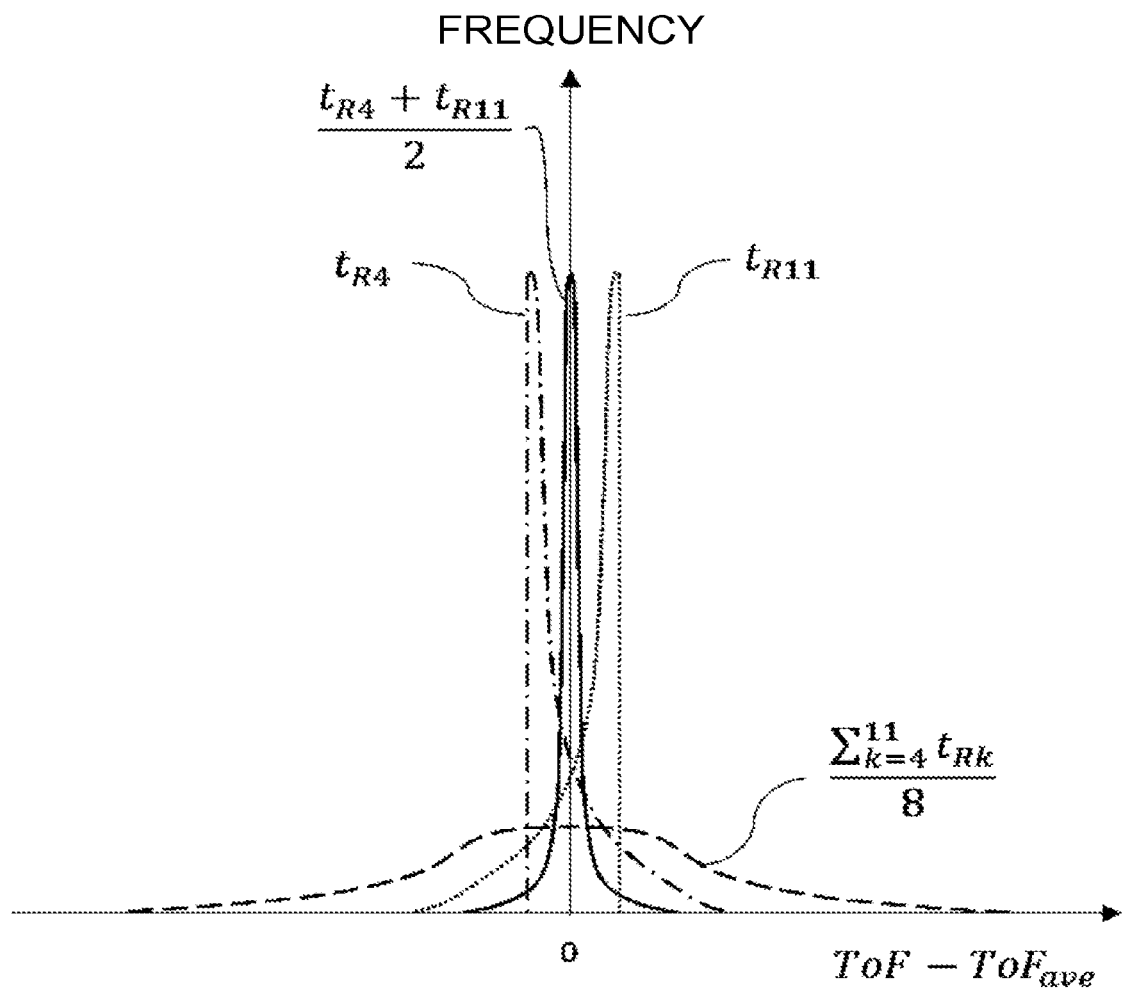
FIG. 7 is a diagram for illustrating accuracy of ToF calculated from the light receiving times included in the frequency calculation zone.

FIG. 7 is a diagram for illustrating an error of the determined ToF. FIG. 7 illustrates an occurrence rate of the ToF in the case where each of the light receiving time $t_{R4}$, the light receiving time $t_{R11}$ the average value between the light receiving time $t_{R4}$ and the light receiving time $t_{R11}$, and the average value among the light receiving time $t_{R4}$ to the light receiving time $t_{R11}$ is set to be the ToF. ToF$_{ave}$ represents an average value in the case where the determination of the ToF corresponding to each of the four light receiving times mentioned above is performed a plurality of times.

For example, in the case where the light receiving time $t_{R4}$ is ToF (hereinafter also referred to as ToF$_{tR4}$), the average value in the case where the ToF$_{tR4}$ is determined a plurality of times is illustrated as ToF$_{ave}$. In the case where the light receiving time $t_{R11}$ is ToF (hereinafter also referred to as ToF$_{tR11}$), the average value in the case where the ToF$_{tR11}$ is determined a plurality of times is illustrated as ToF$_{ave}$.

Assuming that the average value among the light receiving time $t_{R4}$ to the light receiving time $t_{R11}$ is ToF, the ToF is highly likely to include an error. This is because the light receiving time with large standard deviation is used to determine ToF as described with reference to FIG. 6.

Meanwhile, ToFs determined on the basis of the light receiving time with small standard deviation described with reference to FIG. 6, that is, the light receiving time $t_{R4}$, the light receiving time $t_{R11}$, and the average value between the light receiving time $t_{R4}$ and the light receiving time $t_{R11}$ are highly likely to take specific values, and are less likely to include errors.

In order to enhance the accuracy of the distance d, it is preferable to employ a method that is less likely to include an error in the ToF. Therefore, in the present embodiment, ToF is determined on the basis of the average value between the first light receiving time $t_{R4}$ and the last light receiving time $t_{R11}$ among the light receiving times included in the time zone in which the reflected light is received. Alternatively, either the first light receiving time $t_{R4}$ or the last light receiving time $t_{R11}$ may be set as ToF among the light receiving times included in the time zone in which the reflected light is received.

While the present embodiment has been described as above, various modifications can be implemented and executed. Hereinafter, variations of the operation of the electronic apparatus 100 will be described. For example, in the present embodiment, the control unit 111 issues commands to the light source 101, the measurement unit 103, and the generation unit 112 in step S101. As a variation, a command and notification to another component of the electronic apparatus 100 may be further added, a command may be issued with content different from that of the command described, or at least a part of the commands described may not be issued.

As a variation, an exemplary command and notification added by the control unit 111 will be described below. The control unit 111 may notify the light receiving unit 102 of information regarding pulsed light to be emitted by the light source 101. The information regarding the pulsed light is, for example, a pulse width, emission time, a shape, an emission direction, and the like of the pulsed light.

The control unit 111 may transmit a command to cause the light receiving unit 102 to output signals indicating that photons have been received in a predetermined time zone. For example, in the present embodiment illustrated in FIG. 2, the control unit 111 may command the light receiving unit 102 to transmit, to the measurement unit 103, signals indicating that photons have been received in the measurement range from the time 0 to the time $t_1$. The commands are transmitted to the optical receivers 102a, 102b, and 102c included in the light receiving unit 102.

The control unit 111 may transmit, to the measurement unit 103, a command to start measurement of the light receiving time and a command to terminate the measurement of the light receiving time without issuing a command of the measurement range. That is, in the present embodiment illustrated in FIG. 2, the control unit 111 may transmit, to the measurement unit 103, a command to start measurement of the light receiving time at the time 0, and may transmit a command to terminate the measurement of the light receiving time at the time $t_1$. Furthermore, the control unit 111 may transmit, to the measurement unit 103, a command to immediately start the measurement of the light receiving time at the time 0, and may transmit, to the measurement unit 103, a command to immediately terminate the measurement of the light receiving time at the time $t_1$. Note that those commands are transmitted to the measuring instruments 103a, 103b, and 103c included in the measurement unit 103.

Moreover, as a variation, the light source 101, the measurement unit 103, and the generation unit 112 may set a part of the content of the command described in the present embodiment in advance. Along with this, the commands from the control unit 111 may not be issued partially. For example, the light source 101 may be set to emit rectangular pulsed light with the pulse width PW, and the control unit 111 may issue commands regarding the time at which the pulsed light is emitted and the direction in which the pulse width is emitted.

Further, the measurement unit 103 and the generation unit 112 may set the time length $T_M$ of the measurement range in advance, and may set the measurement range in response to a command to start measurement of the light receiving time from the control unit 111.

Furthermore, as a variation of the command of the control unit 111, although the starting end of the measurement range is the time 0 in the present embodiment, the starting end of the measurement range is not limited to the time 0. For example, the time at which the light receiving time is measured may not be included in the measurement range. The control unit 111 can set a predetermined time zone as the measurement range, such as, in the case where the time at which the reflected light is received can be predicted to a certain extent, setting the periphery (e.g., 10 ns before and after) of the time as the measurement range. Even in this case, the start time of the measurement of the light receiving time performed by the measurement unit 103 coincides with the emission time of the pulsed light performed by the light source 101.

In the present embodiment, in step S103, the measurement unit 103 and the generation unit 112 measure the light receiving time with the time at which the pulsed light is emitted as the time 0, thereby generating light receiving time data. The setting of the time is not limited to the case of the present embodiment. As a variation, time other than zero may be assigned as the time at which the pulsed light is emitted. Taking the present embodiment illustrated in FIG. 2 as an example, the measurement unit 103 and the generation unit 112 may measure the light receiving time and generate the light receiving time data using actual time.

As a variation of step S103, the measurement unit 103 and the generation unit 112 may perform the measurement and generate the light receiving time data on the basis of time. For example, the measuring instruments 103a, 103b, and 103c included in the measurement unit 103 may transmit, to the generation unit 112, the time at which the corresponding optical receiver has received a photon. The generation unit may generate light receiving time data in which the time at which the pulsed light is emitted and the time at which the optical receiver receives a photon are arranged.

Note that, in this case as well, operation is similar to the operation of the electronic apparatus 100 described in the present embodiment. Since the difference is the time in the variation, the selection unit 114 only determines the time at which the reflected light is received. The calculation unit 115 calculates ToF by subtracting the time at which the pulsed light is emitted from the time at which the reflected light is received. The operation of the electronic apparatus 100 other than the difference is similar to the case of the present embodiment.

As a variation of step S103, the generation unit 112 may not receive a command regarding the measurement range from the control unit 111, and may generate the light receiving time data while the electronic apparatus 100 is in operation. Note that, in the case of performing the variation, the control unit 111 may issue, to the data processing unit 113, a command regarding a time range for which the light receiving time distribution is to be calculated from the light receiving time data.

In the present embodiment, in step S104, the data processing unit 113 calculates the light receiving time distribution upon reception of the notification from the generation unit 112. As a variation, the data processing unit 113 may receive a command from the control unit 111 to calculate the light receiving time distribution. In that case, the generation unit 112 transmits, to the control unit 111, notification indicating that the generation of the light receiving time data in the measurement range has been complete.

As a variation of step S104, the data processing unit 113 may calculate the light receiving time distribution without the end of the measurement range. For example, the data processing unit 113 may calculate the light receiving time distribution in the light receiving time interlocked with the current time, or may calculate the light receiving time distribution in the light receiving time interlocked with the time before the current time by a predetermined time.

Figure 8:
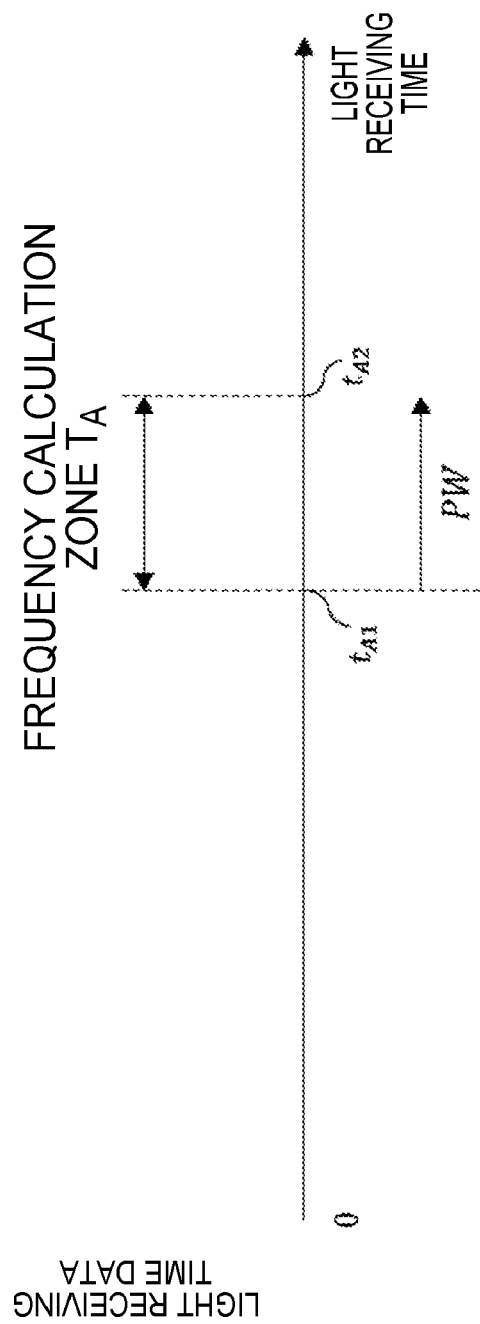
FIG. 8 is an example of the frequency calculation zone that can be applied to the first embodiment.
Figure 9:
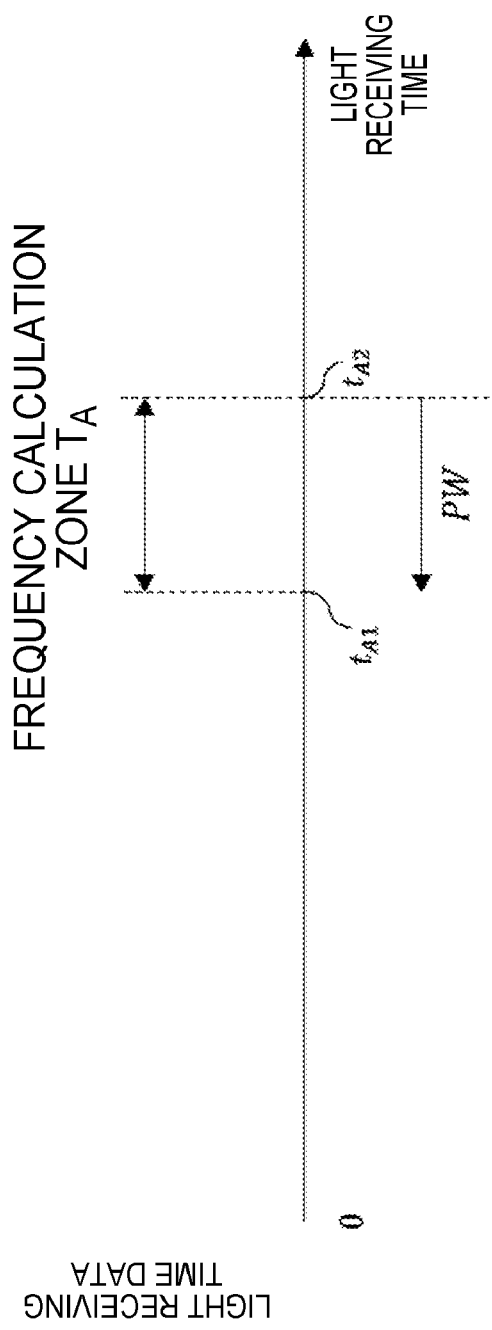
FIG. 9 is another example of the frequency calculation zone that can be applied to the first embodiment.

As a variation of step S104, the frequency calculation zone described in the present embodiment is not limited to the case of being centered on the predetermined light receiving time. For example, FIG. 8 illustrates, as one of variations, an exemplary case where a zone following the light receiving time $t_{A1}$ by the time length TA is set as a frequency calculation zone. FIG. 9 illustrates, as one of variations, an exemplary case where a zone preceding the light receiving time $t_{A2}$ by the time length TA is set as a frequency calculation zone.

As a variation of step S104, the time length TA of the frequency calculation zone described in the present embodiment is not limited to the pulse width PW. The data processing unit 113 can set the time length TA optionally. Note that, since the reflected light is highly likely to fall within the pulse width PW, there is a high possibility that the time zone in which the reflected light is received can be selected from the light receiving time distribution in the case where the time length TA is equal to or more than the pulse width.

As a variation of step S104, the data processing unit 113 may cause the storage 104 to retain the calculated light receiving time distribution. At the stage of transition to step S105, the control unit 111 may transmit a command to the selection unit 114, and the selection unit 114 may read the light receiving time distribution from the storage 104.

In the present embodiment, the selection unit 114 selects the time zone in which the reflected light is received on the basis of the histogram of the light receiving time distribution in step S105. As a variation, the selection unit 114 may set a threshold value in the histogram of the light receiving time distribution.

Figure 10:
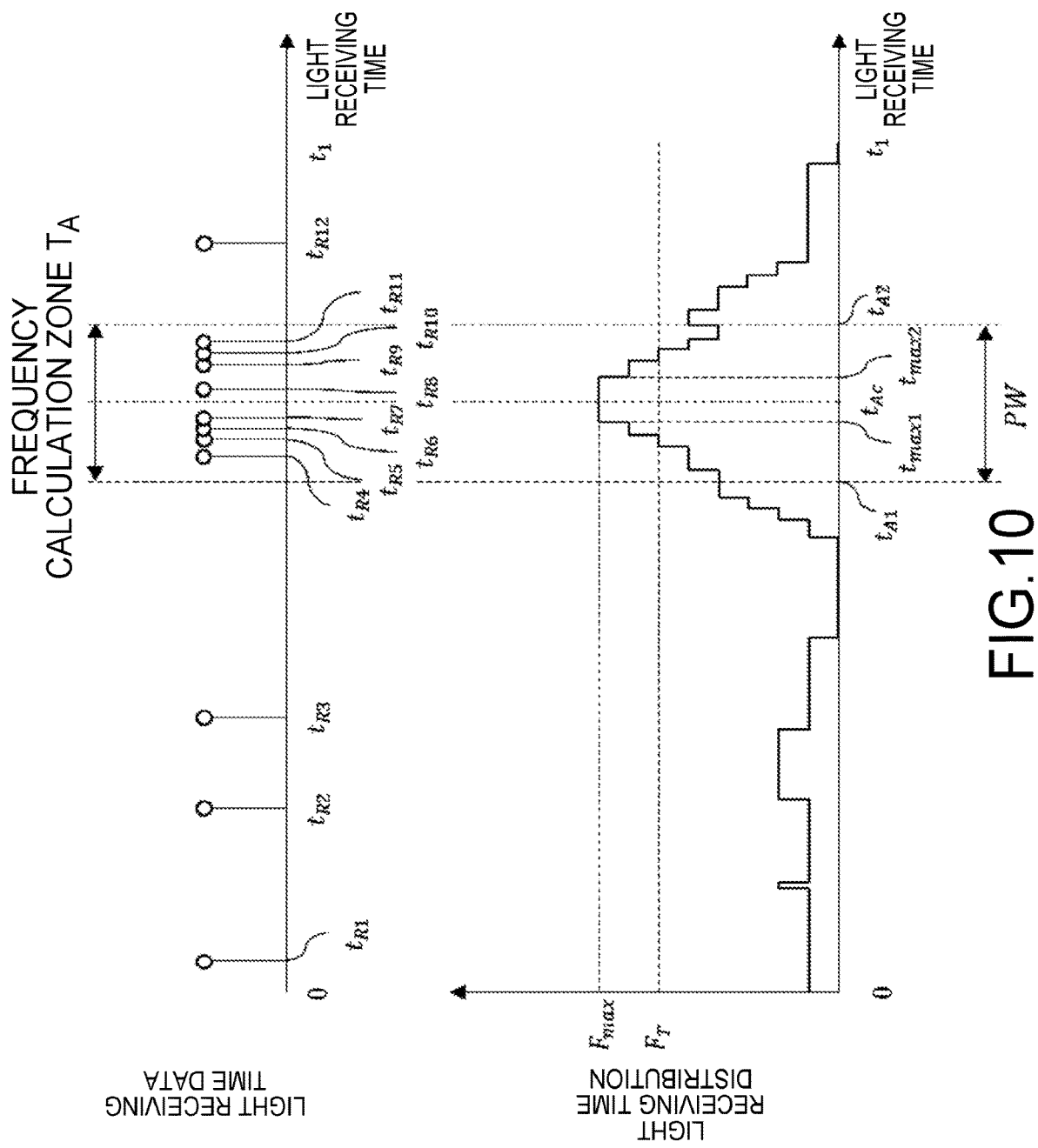
FIG. 10 is a diagram for illustrating a threshold value for a histogram of the light receiving time distribution that can be applied to the first embodiment.

The variation will be described with reference to FIG. 10. In FIG. 10, in addition to FIG. 4 described in the present embodiment, a threshold value FT is set in the light receiving time distribution. The selection unit 114 may select, as the time zone in which the reflected light is received, a time zone in which the number of the light receiving times included is equal to or higher than the threshold value FT and the number of the light receiving times included is the largest from among a plurality of frequency calculation zones.

By setting the threshold value, it becomes possible to suppress erroneous measurement of the ToF in the case where no reflected light is received within the measurement range. Further, as a variation, in the case where no reflected light is received within the measurement range, the selection unit 114 may make notification to the control unit 111, or may cause the output unit 105 to output information notifying the user of an error. Upon reception of the notification, the control unit 111 may start over from the previous step. For example, it may start over from step S101 described in the present embodiment.

As a variation of steps S104 and S105, the data processing unit 113 may not calculate the histogram of the light receiving time distribution, and the selection unit 114 may select the time zone in which the reflected light is received. For example, the selection unit 114 may set a frequency calculation zone centered on the light receiving time, and may select the time zone in which the reflected light is received on the basis of the number of the light receiving times included in the frequency calculation zone.

By reducing the frequency calculation zones to be set, the load on the processing unit 110 is reduced.

In the present embodiment, in step S106, the selection unit 114 determines the ToF to be the average value between the first light receiving time $t_{R4}$ and the last light receiving time $t_{R11}$ among the light receiving times included in the time zone in which the reflected light is received. The ToF is not limited to the average value. As described with reference to FIGS. 6 and 7, it is sufficient if the selection unit 114 make determination such that the ToF has a low possibility of including an error. As a variation, for example, ToF may be the light receiving time $t_{R4}$ and the light receiving time $t_{R11}$ with small standard deviation in FIG. 6. The ToF may be the average value between a first light receiving time $t_{R5}$ and a second light receiving time $t_{R10}$ from the last among the light receiving times included in the time zone in which the reflected light is received.

In addition to the above, the selection unit 114 can select the time at which the reflected light is received in a similar manner to the present embodiment even if the light receiving time measured by a method different from that of the light receiving time described in the present embodiment and the variations is used.

As a variation of step S106, the selection unit 114 may cause the storage 104 to retain the determined ToF. At the stage of transition to step S106, the control unit 111 may transmit a command to the calculation unit 115, and the calculation unit 115 may read the ToF from the storage 104.

In the present embodiment, in step S107, the calculation unit 115 calculates the distance d between the electronic apparatus 100 and the object 200 on the basis of the ToF and the formula (1). The distance d is transmitted to the output unit 105. As a variation, the calculation unit 115 may cause the storage 104 to retain at least one of the ToF and the distance d. At the stage of transition to step S108, the control unit 111 may transmit a command to the output unit 105, and the output unit 105 may read at least one of the ToF and the distance d from the storage 104.

In the present embodiment, the output unit 105 outputs information including the distance d in step S108. As a variation, the output unit 105 may receive the ToF from the calculation unit 115, and may output it as information including the ToF. Further, the output unit 105 may combine and output information including the distance d and information including the ToF.

The transmission of commands, data, and information in each step described in the present embodiment may be performed on the basis of a command from the control unit 111.

The foregoing has described the variations of the operation of the electronic apparatus 100. Next, variations of the configuration of the electronic apparatus 100 will be described.

In the present embodiment, in step S101, the control unit 111 issues a command such that the time at which the light source 101 emits the pulsed light and the time at which the generation unit 112 starts the data generation are the same time. As a variation, the pulsed light emitted from the light source 101 may be partially reflected, and a command to start the data generation may be transmitted to the generation unit 113 upon reception of the light. In the variation, the command to start data generation is immediately after the light source 101 emits the pulsed light.

Figure 11:
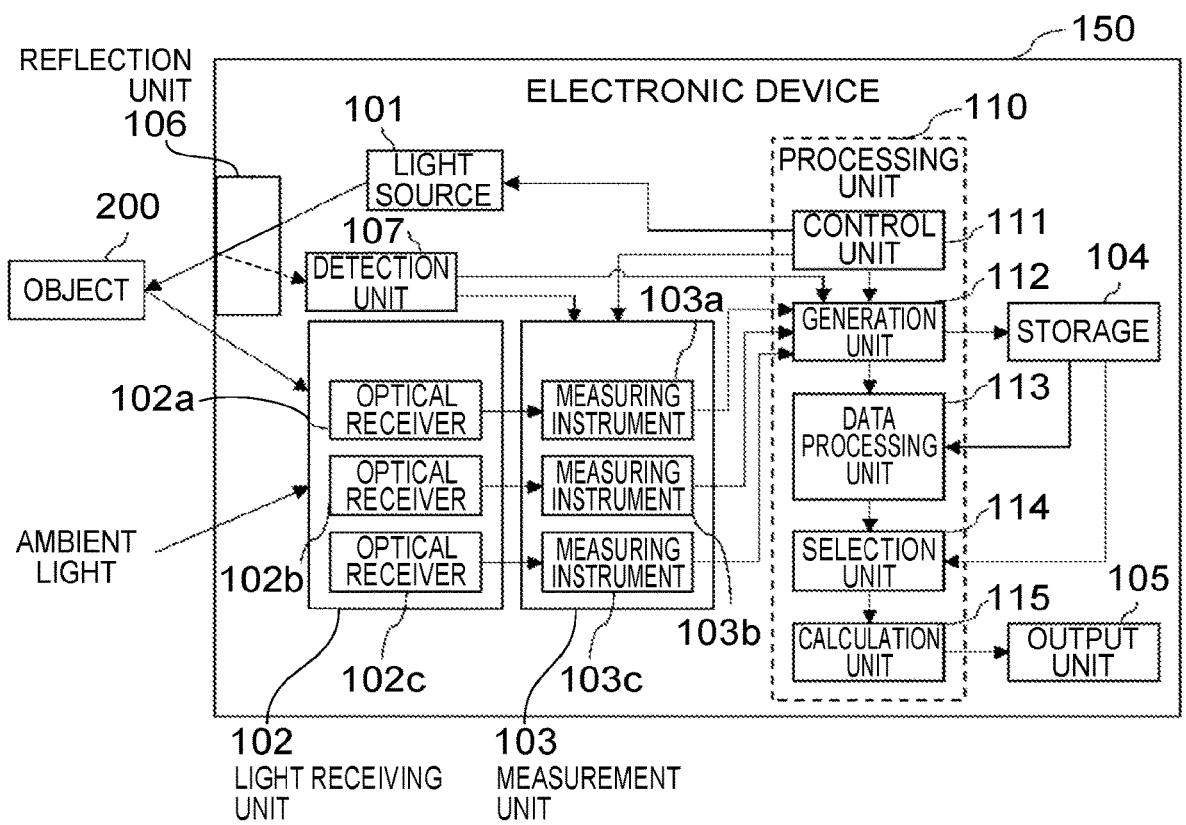
FIG. 11 is a diagram of the distance measurement system including the electronic apparatus.

Such an electronic apparatus (electronic device) 150 will be described as an example with reference to FIG. 11. In addition to the electronic apparatus 100, the electronic apparatus 150 includes a reflection unit 106, and a detection unit 107. Among components included in an electronic apparatus (electronic device) 160, the components included in the electronic apparatus 100 are denoted by the same reference signs, and descriptions thereof will be omitted.

The reflection unit 106 partially reflects the pulsed light emitted from the light source 101, and transmits the remaining pulsed light.

The detection unit 107 detects the pulsed light reflected by the reflection unit 106, and transmits, to the measurement unit 103 and the generation unit 112, signals indicating that the light source 101 has emitted the pulsed light. The measurement unit 103 sets the time at which the signals are received as the time at which the pulsed light is emitted. The measurement range is determined on the basis of the set time. The generation unit 112 sets the time at which the signals are received as the time at which the pulsed light is emitted, and generates light receiving time data.

Note that, in the variation, the control unit 111 does not command the measurement unit 103 and the generation unit 112 to start measurement of the light receiving time and to start generation of the light receiving time data. The control unit 111 may issue commands regarding the time length $T_M$ of the measurement range, termination of the measurement of the light receiving time, and termination of the generation of the light receiving time data to the measurement unit 103 and the generation unit 112.

The operation of the electronic apparatus 150 is similar to the operation of the electronic apparatus 100 described in the present embodiment except for the handling of the time at which the pulsed light is emitted described in the variation, and thus descriptions of the subsequent operation will be omitted.

Further, the detection unit 107 may detect the pulsed light reflected by the reflection unit 106, and may transmit a command to start measurement of the light receiving time and a command to start generation of the light receiving time data to the measurement unit 103 and the generation unit 112, respectively. Furthermore, the detection unit 107 may transmit signals indicating that the light source 101 has emitted the pulsed light to the control unit 111.

The control unit 111 that has received the signals may transmit a command to start measurement of the light receiving time and a command to start generation of the light receiving time data to the measurement unit 103 and the generation unit 112, respectively. In the case where the signals are not received from the detection unit 107 even when a predetermined period of time has elapsed from the time of the pulsed light emission, the control unit 111 may restart from step S101, or may cause the output unit 105 to output information notifying the user of an error.

With this arrangement, it becomes possible to cope with the case where the light source 101 does not emit pulsed light due to failure or the like.

The operation in the processing unit 110 described in the present embodiment and the variation may be implemented by a program being processed. For example, a general-purpose computer incorporating the program may be caused to perform the operation in the processing unit 110.

The program may be stored and provided in a computer readable storage medium, such as a compact disc read-only memory (CD-ROM), a memory card, a CD recordable (CD-R), and a digital versatile disk (DVD), as a file in an installable or executable format. Furthermore, the program may be stored in a computer connected to a network, such as the Internet, to be provided via the network, or may be incorporated and provided in a storage medium, such as a ROM, a hard disk drive (HDD), and a solid state drive (SSD).

The present embodiment and the variations have been described above. Next, examples of application of the electronic apparatus 100 described in the present embodiment will be described below.

In the present embodiment, the electronic apparatus 100 calculates the distance d to the object 200. As an example of application, the electronic apparatus 100 emits pulsed light in various directions and receives reflected light to determine ToF, thereby making it possible to create a layout showing the arrangement of objects around the electronic apparatus 100.

Figure 12:
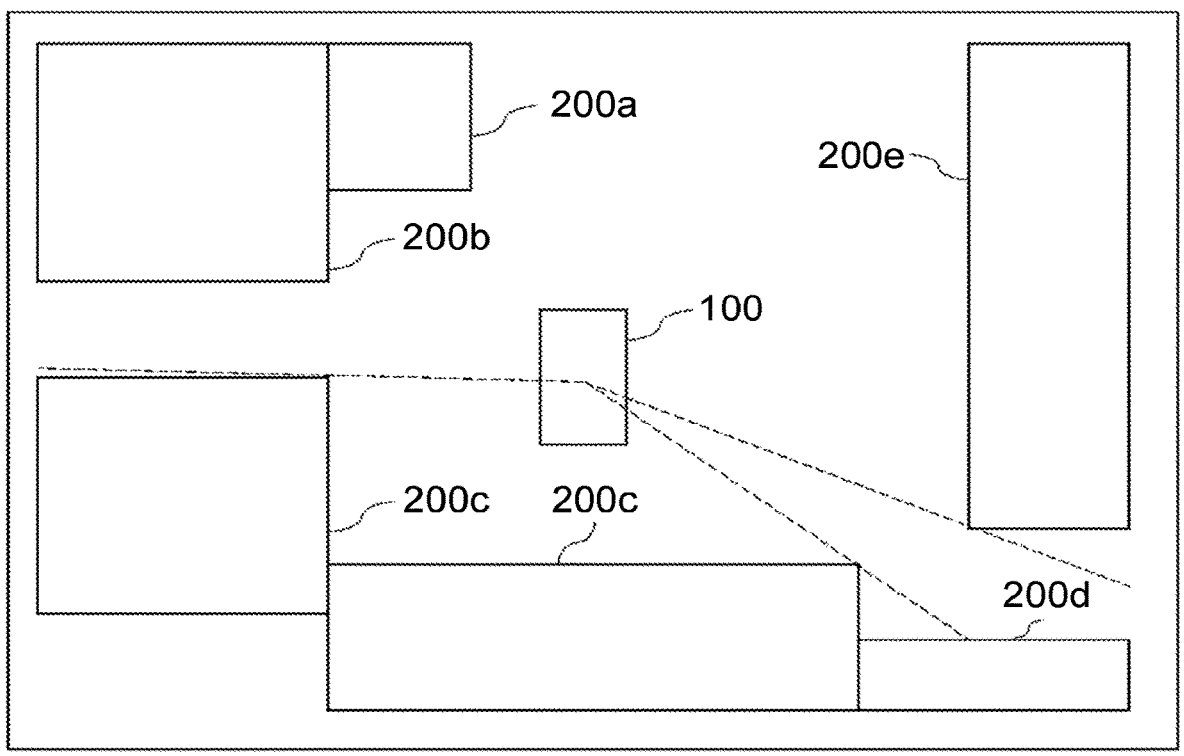
FIG. 12 is a diagram for illustrating arrangement of objects in two dimensions.

A case where the electronic apparatus 100 creates the layout will be described with reference to FIG. 12. In FIG. 12, objects 200a to 200e are arranged around the electronic apparatus 100.

The electronic apparatus 100 emits pulsed light in various directions, and calculates the distances between the electronic apparatus 100 and the objects 200a to 200e in a similar manner to the present embodiment. The calculation unit 115 creates a layout showing the arrangement of the surrounding objects on the basis of the distance.

Figure 13:
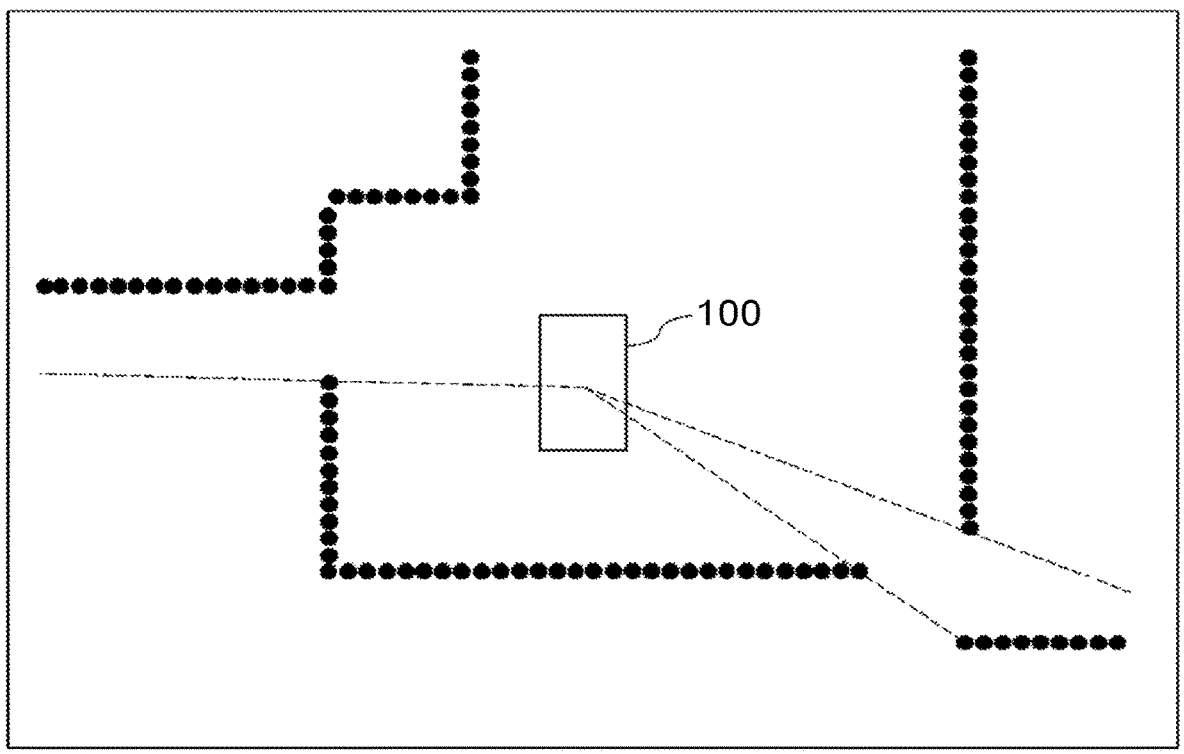
FIG. 13 is a diagram for illustrating a layout of objects in two dimensions.

An example of the created layout is illustrated in FIG. 13. The calculation unit 115 can plot points at the coordinates of the objects 200a to 200e to create a layout of the objects 200a to 200e.

Information regarding the coordinates included in the points may be orthogonal coordinates, polar coordinates, absolute coordinates (world coordinates), or relative coordinates. As the relative coordinates, for example, the center of gravity of the electronic apparatus 100 may be used as a reference, or the position of the light source 101 may be used as a reference. In addition, a means for displaying the information regarding the coordinates is not limited to points, but may be vectors.

In the layout, for example, a mobile object that performs autonomous operation, on which the electronic apparatus 100 is mounted, is used to control a power unit. In addition, by adding location information to the layout and using it as obstacle data, the mobile object that performs autonomous operation can easily obtain the data to use it. The acquisition of the location information can use an existing method.

Although the layout illustrated in FIG. 13 is a plane surface, a three-dimensional space (real space) at three-dimensional points may be shown. An example of the layout in the three-dimensional space will be described with reference to FIGS. 14 and 15.

Figure 14:
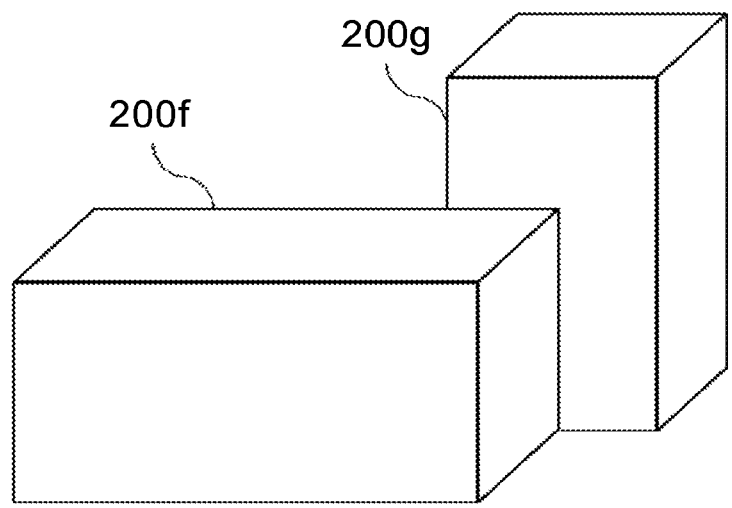
FIG. 14 is a diagram for illustrating arrangement of objects in three dimensions.
Figure 14:
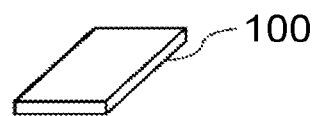

FIG. 14 illustrates that objects 200f and 200g are arranged around the electronic apparatus 100. The electronic apparatus 100 emits pulsed light in various directions, and calculates the distances between the electronic apparatus 100 and the objects 200f and 200g in a similar manner to the present embodiment. The calculation unit 115 creates a layout showing the arrangement of the surrounding objects on the basis of the distance.

Figure 15:
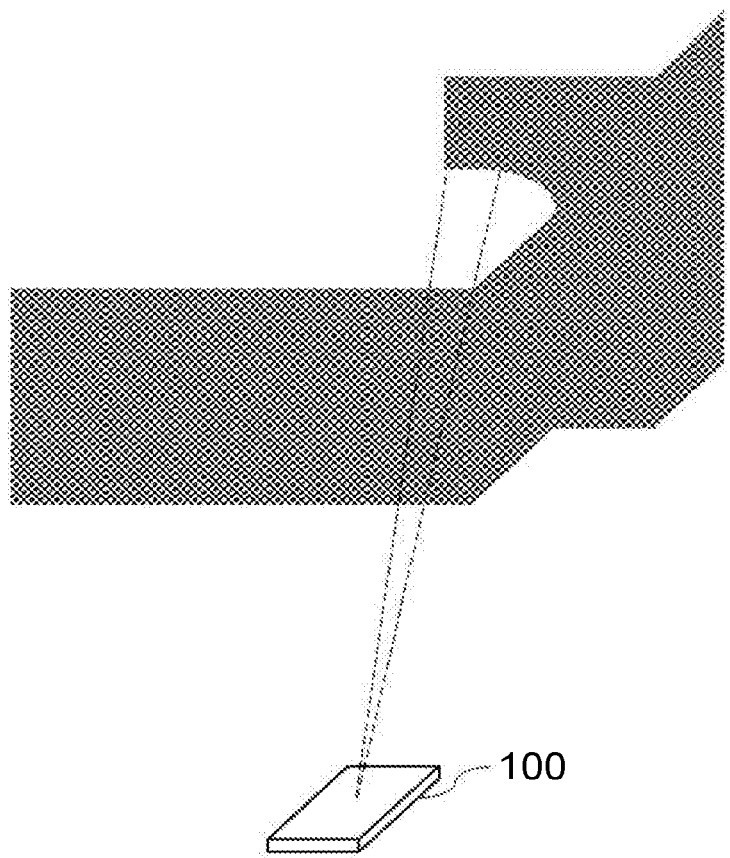
FIG. 15 is a diagram for illustrating a layout of objects in three dimensions.

An example of the created layout is illustrated in FIG. 15. The calculation unit 115 can plot points at the coordinates of the objects 200f and 200g to create a layout of the objects 200f and 200g.

In a similar manner to the case of the two-dimensional layout, information regarding the coordinates included in the three-dimensional points may be orthogonal coordinates, polar coordinates, absolute positions (world positions), or relative positions. As the relative positions, for example, the center of gravity of the electronic apparatus 100 may be used as a reference, or the position of the light source 101 may be used as a reference. In addition, a means for displaying the information regarding the coordinates is not limited to three-dimensional points, but may be three-dimensional vectors.

In a similar manner to the two-dimensional layout, in the three-dimensional layout as well, location information may be added to be used as obstacle data.

The calculation unit 115 may transmit the created layout to the output unit 105, or may cause the storage 104 to retain it. In a similar manner to the distance d described in the present embodiment, the output unit 105 outputs it to an output destination.

Furthermore, an example of application of the layout is not limited to the position of an object. For example, a state in vivo can be expressed in a three-dimensional view when it is applied to an endoscope, and a state of a construction can be expressed in a two-dimensional view or a three-dimensional view when it is applied to a construction. The state in vivo is, for example, the arrangement of organs, the presence or absence of swellings, depressions, holes, and tumors, and the like. The state of a construction is, for example, no abnormality, cracks, unevenness, holes, deflection, and the like. Note that those examples are also included in the layout.

Figure 16:
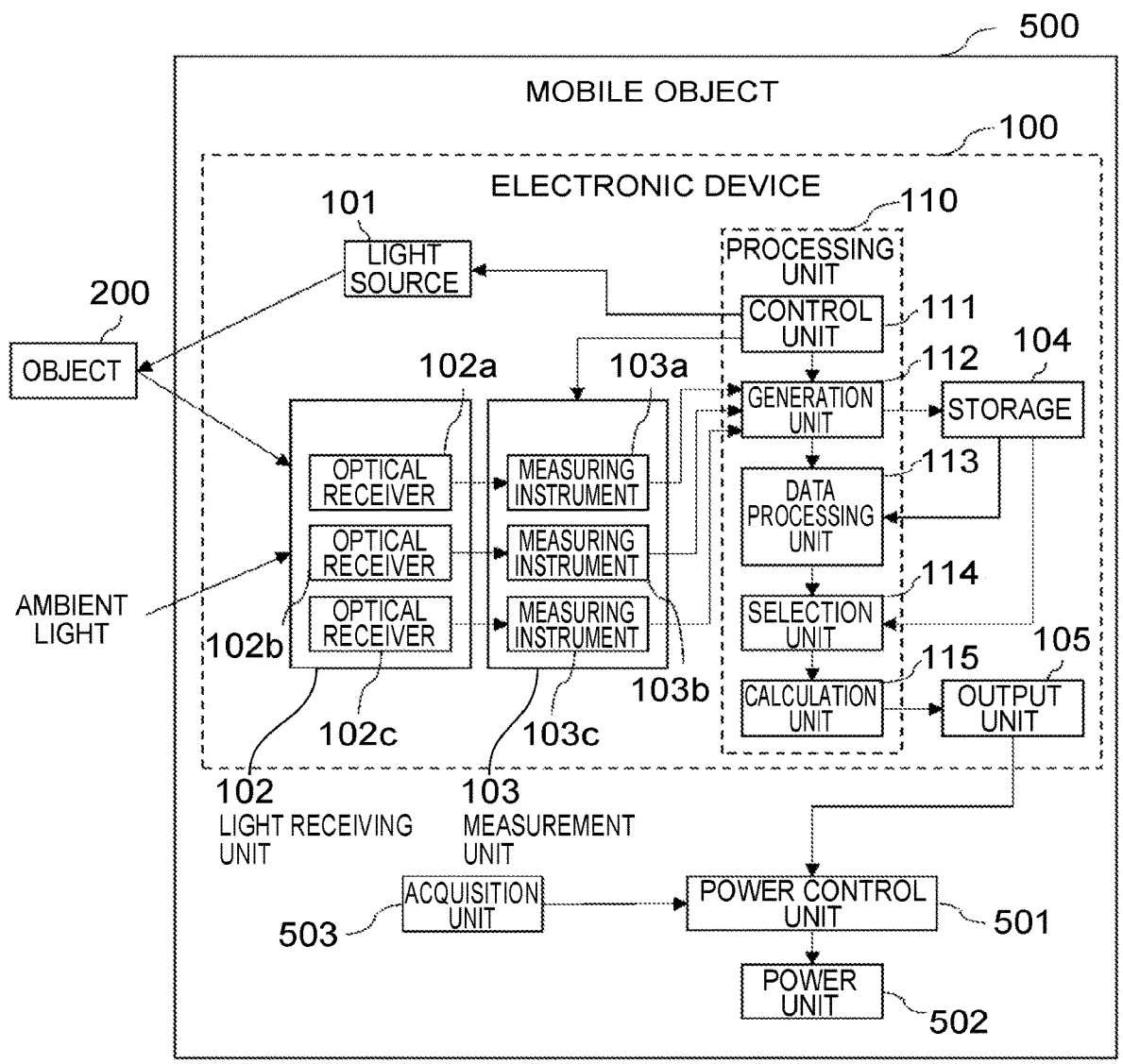
FIG. 16 is a configuration diagram of a mobile object including the electronic apparatus.

As a further example of application, a mobile object that moves using the layout will be described. An example of the mobile object is illustrated in FIG. 16. A mobile object 500 is a movable object, which is, for example, a vehicle, a wagon, a flyable object (manned plane and unmanned plane (e.g., unmanned aerial vehicle (UAV) and drone)), a robot (including an endoscope with a movable distal end), or the like. In addition, the mobile object 500 is, for example, a mobile object that travels through driving operation by a person, or a mobile object capable of automatically (autonomously) traveling without driving operation by a person. An exemplary case where the mobile object 500 is a four-wheeled vehicle capable of autonomously traveling will be described below.

In addition to the electronic apparatus 100, the mobile object 500 includes a power control unit 501, a power unit 502, and an acquisition unit 503. Further, the output unit 105 transmits the layout created by the calculation unit 115 to the power control unit 501.

The power control unit 501 commands the power unit 502 to drive. More specifically, the power control unit 501 determines a direction, speed, and acceleration in which the mobile object 500 moves on the basis of the layout transmitted from the output unit 105 and the information transmitted from the acquisition unit 503, and commands the power unit 502 to drive such that the direction, the speed, and the acceleration are implemented.

By the command of the power control unit 501, an accelerating amount, a braking amount, a steering angle, and the like of the mobile object 500 are controlled. For example, the power control unit 501 controls the drive of the mobile object 500 such that, while objects such as obstacles are avoided, the ongoing lane is maintained and an inter-vehicular distance of a predetermined distance or more is maintained with a preceding vehicle.

The power unit 502 is a driving device mounted on the mobile object 500. The power unit 502 is, for example, an engine, a motor, a wheel, or the like. The power unit 502 is driven by a command of the power control unit 501 to drive the mobile object 500.

The acquisition unit 503 obtains various kinds of information necessary for autonomous traveling. That is, for example, location information of the mobile object 500, an image around the mobile object 500, relative location information transmitted from mobile objects around the mobile object 500, and the like. In order to obtain those various kinds of information, the acquisition unit 503 includes any device such as a millimeter-wave radar sensor, a sonar sensor for detecting an object using sound waves, an ultrasonic sensor, a stereo camera, a monocular camera, and a wired or wireless communication device.

Note that the power control unit 501 is mounted as a processor or the like described in the present embodiment. The power control unit 501 and the acquisition unit 503 may be mounted on one chip, or may be mounted separately. Furthermore, the power control unit 501 and the acquisition unit 503 may be incorporated in the electronic apparatus 100. In that case, the power control unit 501 may be incorporated in the processing unit 110.

As described above, the mobile object 500 is capable of autonomously traveling while avoiding objects, such as obstacles, at least on the basis of the layout showing the arrangement of objects created by emitting pulsed light and receiving reflected light.

While the case of a four-wheeled vehicle capable of autonomously traveling has been described in the example of application, it is also possible to autonomously travel in a similar manner even in the case of other mobile objects mentioned as examples of the mobile object 500, although the power unit 502 is different.

For example, in the case where the mobile object 500 is a drone, the power unit 502 is a motor that rotates blades, and a motor that adjusts the angles of the blades. The power control unit 501 determines a rotating speed of the motor that rotates the blades, an angle of the motor that adjusts the angles of the blades, acceleration of each motor, and the like on the basis of the layout and the acquisition unit 503, and provides the power unit 502 with a command. The power unit 502 drives on the basis of the command of the power control unit 501, whereby the mobile object 500 can travel autonomously.

For example, in the case where the mobile object 500 is a robot, the power unit 502 is a motor that circles, rotates, and adjusts the angle of at least one of an arm and a leg. The arm is, for example, a robot arm or the like. Furthermore, in the case where the robot is an endoscope with a movable distal end, the movable portion is included in the arm. The leg may be, for example, a leg with a wheel and a joint. The power control unit 501 determines rotating speeds of the motors in the arm and the leg, angles of the motors, acceleration of each motor, and the like on the basis of the layout and the acquisition unit 503, and provides the power unit 502 with a command. The power unit 502 drives on the basis of the command of the power control unit 501, whereby the mobile object 500 can travel autonomously.

Figure 17:
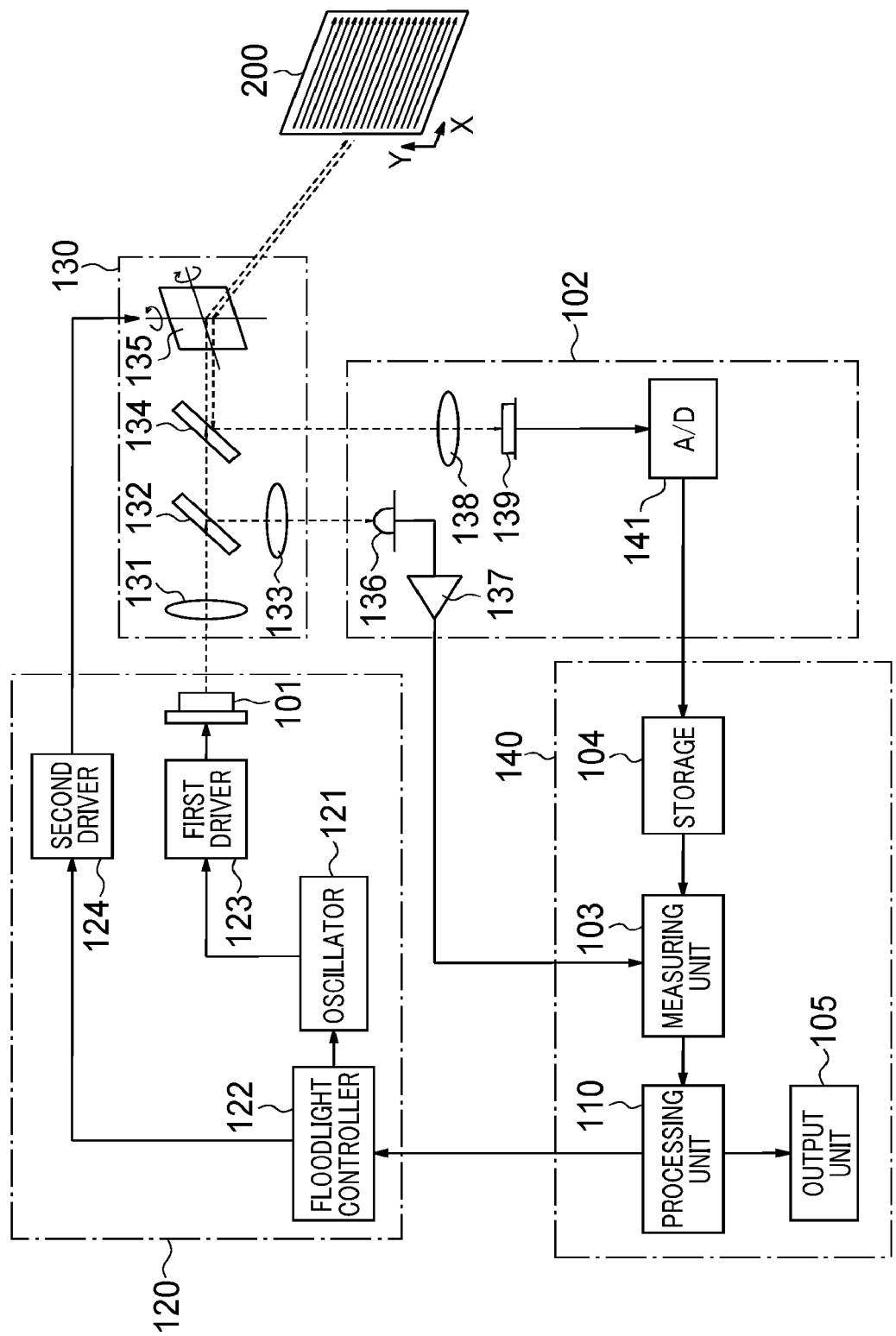
FIG. 17 is a block diagram showing a schematic configuration of a LiDAR apparatus provided with the electronic apparatus according to the present embodiment.

The electronic apparatus 100 according to the present embodiment can be implemented in a LiDAR (Light Detecting And Ranging) apparatus 150 used for autonomous operation or the like. FIG. 17 is a block diagram of showing a schematic configuration of the LiDAR apparatus 150 provided with the electronic apparatus according to the present embodiment.

The electronic apparatus 100 of FIG. 17 includes a floodlight unit 120, a light controller 130, a light receiving unit 102, and a signal processing unit 140. At least part of the electronic apparatus 100 of FIG. 17 can be configured with one or plurality of semiconductor ICs (Integrated Circuits). For example, at least partial components in the signal processing unit 140 may be integrated into one semiconductor chip or the light receiving unit 102 may also be integrated into the semiconductor chip. Moreover, the light floodlight unit 120 may also be integrated into the semiconductor chip.

The floodlight unit 120 emits the above-described pulsed lights cyclically as flood lights. The time from when the floodlight unit 120 emits the first pulsed light until the floodlight unit 120 emits the second pulsed light is a period of time equal to or longer than the time required for the light receiving unit 102 to receive reflected light in accordance with the first pulsed light.

The floodlight unit 120 has an oscillator 121, a floodlight controller 122, a light source 101, a first driver 123, and a second driver 124. The oscillator 121 generates an oscillation signal in accordance with the period of emitting the pulsed light as flood lights. The first driver 123 intermittently supplies power to the light source 101 in synchronism with the oscillation signal. The light source 101 intermittently emits the pulsed light on a basis of the power from the first driver 123. The floodlight controller 122 controls the second driver 124 in synchronism with the oscillation signal. The second driver 124 supplies a drive signal to the light controller 130 in synchronism with the oscillation signal in response to a command from the floodlight controller 122.

The light controller 130 controls the travel direction of the pulsed light emitted from the light source 101. Moreover, the light controller 130 controls the travel direction of received pulsed light.

The light controller 130 has a first lens 131, a beam splitter 132, a second lens 133, a half mirror 134, and a scanning mirror 135.

The first lens 131 collects the pulsed light emitted from the floodlight unit 120 and guides them to the beam splitter 132. The beam splitter 132 divides the pulsed light from the first lens 131 in two directions and guides them to the second lens 133 and the half mirror 134 separately. The second lens 133 guides the divided light from the beam splitter 132 to the light receiving unit 102. The reason for guiding the pulsed light to the light receiving unit 102 is that the light receiving unit 102 detects floodlighting timing.

The half mirror 134 passes the divided light from the beam splitter 132 to guide it to the scanning mirror 135. Moreover, the half mirror 134 reflects light including reflected light incident on the electronic apparatus 100 to the direction of the light receiving unit 102.

The scanning mirror 135 rotates the mirror surface in synchronism with a drive signal from the second driver 124 in the floodlight unit 120. In this way, the scanning mirror 135 controls the reflection direction of the divided light incident on the mirror surface of the scanning mirror 135. By controlling the rotation of the mirror surface of the scanning mirror 135 at a constant cycle, it is possible to scan the pulsed light emitted from the light controller 130 at least in a one-dimensional direction. By providing two shafts in two directions for rotating the mirror surface, it is also possible to scan the pulsed light emitted from the light controller 130 in a two-dimensional direction. FIG. 17 shows an example of scanning the pulsed light emitted from the electronic apparatus 100 as floodlights in an X-direction and a Y-direction by the scanning mirror 135.

In the case where an object 10, such as a human or an object, is present in a scanning range of the pulsed light emitted from the electronic apparatus 100 as floodlights, the pulsed light are reflected by the object 10. At least part of the reflected light reflected by the object 10 propagates in the reverse direction through the passage almost the same as that of the pulsed light and is incident on the scanning mirror 135 in the light controller 130. Although the mirror surface of the scanning mirror 135 is being rotated at a predetermined cycle, since the pulsed light propagate at the speed of light, the reflected light from the object 10 is incident on the mirror surface while there is almost no change in the angle of the mirror surface of the scanning mirror 135. The reflected light from the object 10 incident on the mirror surface is reflected by the half mirror 134 and received by the light receiving unit 102.

The light receiving unit 102 has a light detector 136, an amplifier 137, a third lens 138, a photo-sensor 139, and an A/D converter 141. The light detector 136 receives light divided by the beam splitter 132 and converts it to an electric signal. The light detector 136 can detect the floodlighting timing of the pulsed light. The amplifier 137 amplifies the electric signal output from the light detector 136.

The third lens 138 forms an image of the light reflected by the half mirror 134 on the photo-sensor 139. The photo-sensor 139 receives light and converts it to an electric signal. The photo-sensor 139 has the above-described SiPM (Silicon Photomultiplier).

The A/D converter 141 samples the electric signal output from the photo-sensor 139 at a predetermined sampling rate for A/D conversion to generate a digital signal.

The signal processing unit 140 measures the distance to the object 10 that reflected the pulsed light and stores a digital signal in accordance with the intensity of received light in a storage 104. The signal processing unit 140 has the storage 104, a measuring unit 103, a processing unit 110, and an output unit 105. The storage 104 stores the digital signal A/D-converted by the A/D-converter 141. The measuring unit 103 reads out a digital signal corresponding to the light received by the light receiving unit 102 from the storage 104 to determine the light receiving timing and determine the distance to the object by means of the time difference from the floodlighting timing to the light receiving timing. The measuring unit 103 detects the floodlighting timing of the floodlight unit 120 via the light detector 136 and the amplifier 137. The floodlight unit 120 may notify the measuring unit 103 of information relating to the pulse widths of the pulse lights.

While the present embodiment, the variations, and the examples of application have been described above, those may be performed in combination.

As described above, the electronic apparatus according to the present embodiment and the electronic apparatus according to the variations emit pulsed light to generate light receiving time data for determining ToF. The electronic apparatus calculates light receiving time distribution on the basis of the light receiving time data. The electronic apparatus selects a time zone in which reflected light is received on the basis of the light receiving time distribution. The electronic apparatus determines ToF on the basis of at least one of the first light receiving time and the last light receiving time among the light receiving times included in the time zone in which the reflected light is received. The electronic apparatus calculates a distance to the object by which the pulsed light is reflected on the basis of the determined ToF. With this arrangement, the influence of ambient light can be suppressed, the influence of an error in the number of photons emitted as pulsed light can be suppressed, and the accuracy of distance measurement can be improved.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An electronic apparatus to determine a distance comprising:
    a light source that emits pulsed lights;
    a plurality of measurers configured to output signals indicating reception lights;
    processing circuitry configured to:
    calculate a distribution of reception times of the reception lights based on the reception times of the reception lights based on the signals;
    determine a duration that receives lights including reflected lights based on the distribution of the reception times;
    determine, based on only a plurality of times relating to an earliest time and a latest time included in the duration, an average time that receives the lights including the reflected lights reflected by an object after the pulsed lights are emitted; and
    calculate the distance from the electronic apparatus based on the average time.

2. The electronic apparatus according to claim 1, wherein the processing circuitry calculates the distribution of the reception times based on the number of the reception times included in a first duration of the reception times.

3. The electronic apparatus according to claim 1, wherein the processing circuitry determines the duration in which the number of the reception times is the largest of a plurality of durations included in the distribution as the duration that receives the reflected lights.

4. The electronic apparatus according to claim 1, wherein a length of the duration that receives the reflected light is equal to or more than a pulse width of the pulsed light.

5. The electronic apparatus according to claim 1, further comprising:
    a reflector that partially reflects the pulsed lights; and
    a detector that detects the pulsed lights reflected by the reflector and notifies the plurality of measurers of detecting the pulsed lights, wherein
    the plurality of measurers measure the reception times based on notification by the detector.

6. The electronic apparatus according to claim 1, wherein the processing circuitry creates a layout including information indicating a coordinate of the object based on at least one of the average time and the distance.

7. The electronic apparatus according to claim 6, further comprising:
    a power controller configured to determine a command for a power unit of a mobile object based on the layout.

8. The electronic apparatus according to claim 1, further comprising:

an output unit configured to output at least one of information indicating the distance between the electronic apparatus and the object, and information indicating the average time.

9. The electronic apparatus according to claim 1, further comprising:
a storage that retains at least one of information indicating the earliest time and the latest time, information indicating the average time, and information indicating the distance between the electronic apparatus and the object.

10. A method of determining a distance, comprising:
emitting pulsed lights;
outputting signals indicating reception lights;
calculating a distribution of reception times of the reception lights based on the reception times of the reception lights based on the signals;
determining a duration that receives lights including reflected lights based on the distribution of the reception times;
determining, based on only a plurality of times relating to an earliest time and a latest time included in the duration, an average time that receives the lights including the reflected lights reflected by an object after the pulsed lights are emitted; and
calculating the distance from the electronic apparatus based on the average time.

11. The method according to claim 10, wherein
the distribution of the reception times is calculated based on the number of the reception times included in a first duration of the reception times.

12. The method according to claim 10, wherein
the duration in which the number of the reception times is the largest of a plurality of durations included in the distribution is determined as the duration that receives the reflected lights.

13. The method according to claim 10, wherein
a length of the duration that receives the reflected light is equal to or more than a pulse width of the pulsed light.

14. The method according to claim 10, further comprising:
partially reflecting the pulsed lights; and
detecting the reflected pulsed lights and notifying the plurality of measurers of detecting the pulsed lights, wherein
the reception times is measured based on the notification.

15. The method according to claim 10, wherein
a layout including information indicating a coordinate of the object is created based on at least one of the average time and the distance.

16. The method according to claim 15, further comprising:
a command for a power unit of a mobile object is determined based on the layout.

17. The method according to claim 10, further comprising:
at least one of information indicating the distance between an electronic apparatus and the object, and information indicating the average time is output.

18. The method according to claim 10, further comprising:
at least one of information indicating the earliest time and the latest time, information indicating the average time, and information indicating the distance between an electronic apparatus and the object are stored in a storage.

19. The electronic apparatus according to claim 1, wherein
the duration that receives the lights including the reflected lights based on the distribution of the reception times includes the earliest time, the latest time, and a plurality of intermediate times between the earliest time and the latest time, and
the average time is determined by excluding all of the intermediate times included in the duration.

* * * * *